US012662101B2

(12) United States Patent (10) Patent No.: US 12,662,101 B2

Hurley et al. (45) Date of Patent: Jun. 23, 2026

(54) REDUNDANT GOVERNOR APPARATUS FOR A VEHICLE AIR BRAKE CHARGING SYSTEM

(71) Applicant: Bendix Commercial Vehicle Systems LLC, Avon, OH (US)

(72) Inventors: Ryan S Hurley, Lakewood, OH (US); Randy J Salvatora, Columbia Station, OH (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 785 days.

(21) Appl. No.: 18/053,000

(22) Filed: Nov. 7, 2022

(65) Prior Publication Data

US 2024/0149856 A1 May 9, 2024

(51) Int. Cl.
| | |
|---|---|
| *B60T 17/02* | (2006.01) |
| *B60T 13/68* | (2006.01) |
| *B60T 15/50* | (2006.01) |
| *G05D 16/20* | (2006.01) |

(52) U.S. Cl.
CPC ............ *B60T 17/02* (2013.01); *B60T 13/683* (2013.01); *B60T 15/50* (2013.01); *G05D 16/2022* (2019.01); *G05D 16/2024* (2019.01); *G05D 16/204* (2013.01); *B60T 2270/402* (2013.01); *B60T 2270/413* (2013.01)

(58) Field of Classification Search
CPC ........ B60T 17/02; B60T 13/683; B60T 15/50; B60T 2270/402; B60T 13/26; B60T 2270/413; B60T 17/221; G05D 16/2022; G05D 16/2024; G05D 16/204; F04B 49/02; F04B 49/065
See application file for complete search history.

(56) References Cited

U.S. PATENT DOCUMENTS

| | | | |
|---|---|---|---|
| 2,955,742 A | 10/1960 | Gates | |
| 4,083,608 A | 4/1978 | Shirey | |
| 4,763,959 A * | 8/1988 | Vandemotter | B60T 13/662 |
| | | | 303/7 |
| 5,035,582 A * | 7/1991 | Carroll | B60T 17/02 |
| | | | 417/18 |

(Continued)

FOREIGN PATENT DOCUMENTS

| | | |
|---|---|---|
| EP | 0918675 B1 | 3/2002 |
| JP | 5187664 B2 | 4/2013 |

OTHER PUBLICATIONS

European Patent No. EP 0628755 to Long published on Dec. 14, 1994.*

(Continued)

*Primary Examiner* — Pamela Rodriguez
(74) *Attorney, Agent, or Firm* — Cheryl L. Greenly; Brian E. Kondas; Geoffrey A. Kuolo

(57) ABSTRACT

A redundant governor apparatus is provided for a vehicle air brake charging system. The apparatus comprises a first governor and a second governor. The apparatus also comprises a number of components arranged to enable (i) the first governor to act as primary and the second governor to act as backup to the first governor when the first governor is unable to act as primary, and (ii) the second governor to act as primary and the first governor to act as backup to the second governor when the second governor is unable to act as primary.

15 Claims, 31 Drawing Sheets

(56) References Cited

U.S. PATENT DOCUMENTS

| 6,079,436 | A | 6/2000 | Delfs |
| 7,270,145 | B2 | 9/2007 | Koelzer |
| 8,740,316 | B2 * | 6/2014 | Schal ..................... B60T 17/02 |
| | | | 137/115.18 |
| 2005/0273227 | A1 | 12/2005 | Fogelstrom |
| 2012/0285327 | A1 | 11/2012 | Schael |
| 2015/0219083 | A1 | 8/2015 | Huffman |
| 2021/0146904 | A1 | 5/2021 | Rodrigues |

OTHER PUBLICATIONS

European Patent No. EP 0866394 to Knaust published on Sep. 25, 2002.*
WO document No. WO 2007142008 to Mitsuhashi et al published on Dec. 13, 2007.*
European Patent Office, "International Search Report and Written Opinion," Report, Nov. 24, 2023, 8 pages, Rijswijk Netherlands.

* cited by examiner

Charging
(Below Secondary
Governor Cut-out)

Backup Mode

REDUNDANT GOVERNOR APPARATUS FOR A VEHICLE AIR BRAKE CHARGING SYSTEM

BACKGROUND

The present disclosure relates to vehicle air brake charging systems, and is particularly directed to a redundant governor apparatus for a vehicle air brake charging system, such as a truck air brake charging system.

A truck air brake charging system includes a vehicle air compressor which builds air pressure for an air braking system. A governor controls system air pressure between a preset maximum pressure level and a preset minimum pressure level by monitoring the air pressure in a supply reservoir. When the supply reservoir air pressure becomes greater than that of a preset "cut-out" setting of the governor, the governor controls the compressor to stop the compressor from building air and also causes an air dryer downstream from the compressor to go into purge mode. As the supply reservoir air pressure drops to a preset "cut-in" setting of the governor, the governor returns the compressor back to building air and the air dryer to air drying mode.

The vehicle air compressor is typically a reciprocating air compressor and runs continuously. The compressor runs either in loaded mode or unloaded mode. When the compressor is running in the loaded mode, compressed air is delivered to the air braking system. When the compressor is running in the unloaded mode, compressed air is directed to an alternate place which is other than the air braking system. Also, when the compressor is running in the unloaded mode, an unloader valve operates to release pressurized air building up inside the compressor to reduce pressurized air in the compressor, which in turn reduces the load on the device driving the compressor. This minimizes power consumption during operation of the compressor in the unloaded mode.

In known truck air brake charging systems, if the governor fails to control the system air pressure between the preset maximum pressure level and the preset minimum pressure level, the compressor may not be able to switch over from running in the loaded mode to the unloaded mode. If this were to occur, the unloader valve would be unable to release pressurized air building up inside the compressor to reduce pressurized air in the compressor, and thereby to reduce the load on the device driving the compressor. The result would be a significant impact on fuel economy and engine power of the truck. Accordingly, those skilled in the art continue with research and development efforts in governors used in truck air brake charging systems.

SUMMARY

In accordance with one implementation, a redundant governor apparatus is provided for a vehicle air brake charging system. The apparatus comprises a first governor and a second governor. The apparatus also comprises a number of components arranged to enable (i) the first governor to act as primary and the second governor to act as backup to the first governor when the first governor is unable to act as primary, and (ii) the second governor to act as primary and the first governor to act as backup to the second governor when the second governor is unable to act as primary.

In accordance with another implementation, a redundant governor apparatus is provided for a vehicle air brake charging system. The apparatus comprises a first governor and a second governor. The apparatus also comprises means for enabling the first and second governors to be controlled such that (i) either one of the governors can operate as primary in a primary mode of operation and the other one of the governors can operate as backup in a backup mode of operation, and (ii) either mode of operation can be selected as desired.

In accordance with yet another implementation, a method of operating first and second governors is provided for a vehicle air brake charging system to provide governor redundancy. The method comprises controlling the first governor to act as primary and the second governor to act as backup to the first governor when the first governor is unable to act as primary. The method also comprises controlling the second governor to act as primary and the first governor to act as backup to the second governor when the second governor is unable to act as primary.

DETAILED DESCRIPTION

The present application is directed to a redundant governor apparatus for a vehicle such as a truck. The specific construction of the redundant governor apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Referring to FIGS. 1, 1A, 1B, 1C, and 1D, schematic diagrams are shown of a vehicle air brake charging system 100 in different modes of operation and embodying an example redundant governor apparatus in accordance with a first embodiment. In FIGS. 1, 1A, 1B, 1C, and 1D, solid lines represent pneumatic passages between components, heavy solid lines (i.e., thicker solid lines) represent pressurized pneumatic passages between components, dashed lines represent electrical connections between components, and double-solid lines represent mechanical couplings between components.

Figure 1:
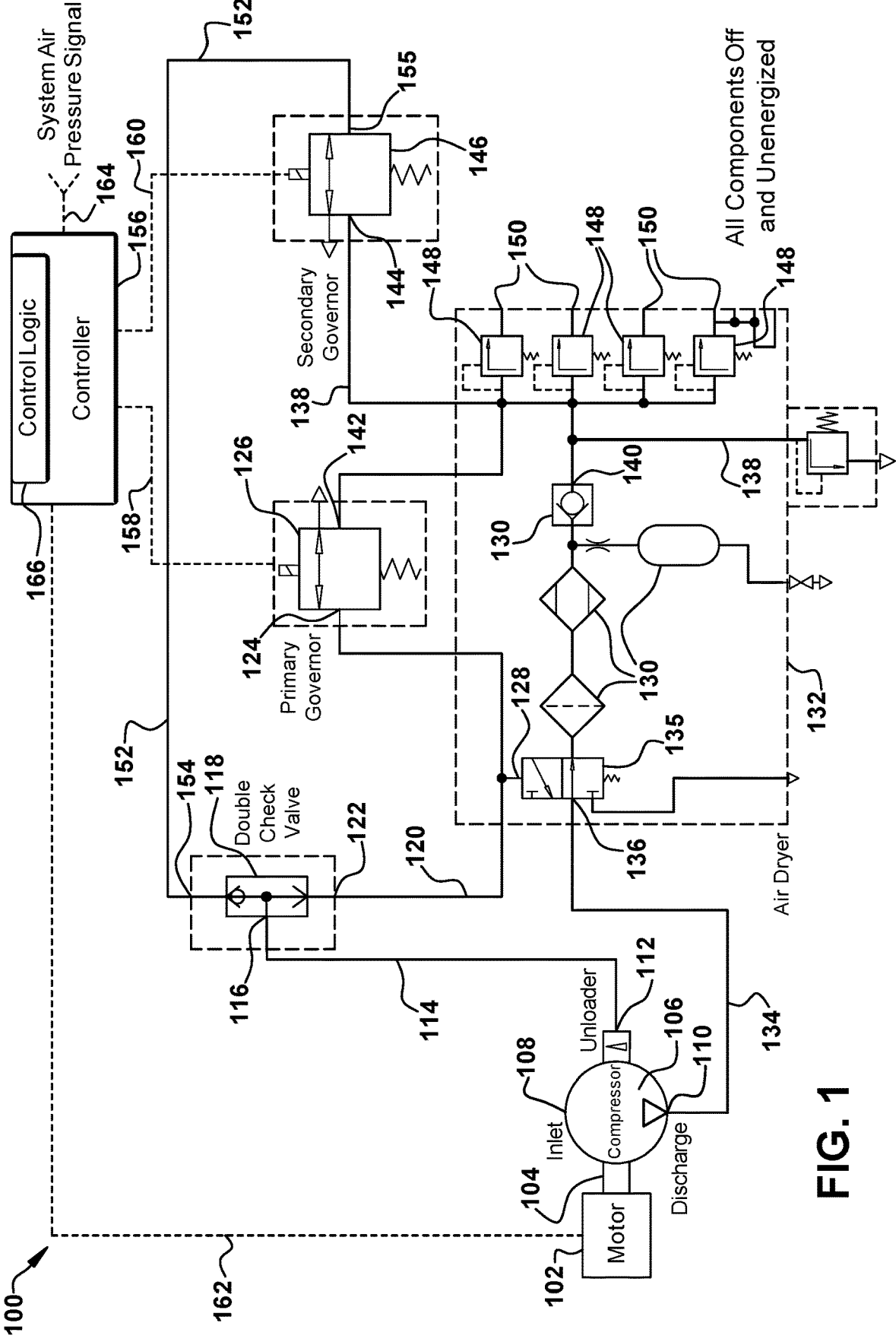
FIGS. 1, 1A, 1B, 1C, and 1D are schematic diagrams of a vehicle air brake charging system in different modes of operation and embodying an example redundant governor apparatus in accordance with a first embodiment.

FIG. 1 shows all components of the vehicle air brake charging system 100 in their off or unenergized states. Compressor motor 102 is coupled via coupling 104 to compressor 106 that has inlet port 108, discharge outlet port 110, and unloader port 112. First passage 114 connects unloader port 112 of compressor 106 and outlet port 116 of double check valve 118. Second passage 120 connects first inlet port 122 of double check valve 118, outlet port 124 of primary governor 126 (i.e., a first governor), and control port 128 of purge valve 135 within air dryer 132. Structure and operation of purge valve 135 and other air dryer components 130 within an air dryer are known and conventional and, therefore, will not be described.

Also, governor operation in vehicle air brake charging systems is known and conventional. Briefly, system air pressure is monitored and controlled between a preset maximum pressure level and a preset minimum pressure level. When system air pressure becomes greater than that of a preset "cut-out" setting of a governor (e.g., primary governor 126 shown in FIG. 1), the governor controls a compressor to stop the compressor from building air. The governor also controls a purge valve to purge air from an air dryer in purge mode. When system air pressure drops to a preset "cut-in" setting of the governor, the governor returns the compressor back to building air and the air dryer to air drying mode.

Third passage 134 connects discharge outlet port 110 of compressor 106 and inlet port 136 of the purge valve 135 within air dryer 132. Fourth passage 138 connects outlet port 140 of the air dryer components 130, inlet port 142 of primary governor 126, inlet port 144 of secondary governor 146 (i.e., a second governor), and through a number of pressure protection components 148 within air dryer 132 to corresponding delivery ports 150 that are connectable to air braking system and air accessories (not shown) of the vehicle. Structure and operation of pressure protection components within an air dryer are known and conventional and, therefore, will not be described. Fifth passage 152 connects second inlet port 154 of double check valve 118 and outlet port 155 of secondary governor 146.

Controller 156 controls primary governor 126 via line 158, secondary governor 146 via line 160, and compressor motor 102 via line 162. In some embodiments, compressor motor 102 may comprise the vehicle engine. In some embodiments, compressor 106 may be electronic or independent from compressor motor 102. In this case, compressor motor 102 can be turned on/off directly without unloading compressor 106.

Controller 156 monitors system pressure signal via line 164 and controls primary governor 126, secondary governor 146, and compressor motor 102 based upon control logic 166 that is stored in a data storage unit of controller 156. System air pressure signal on line 164 may be received from any type of pressure sensor on the vehicle. Controller 156 also monitors operation of first and second governors 126, 146. When controller 156 detects failure of first governor 126 to operate, controller 156 controls second governor 146 based upon control logic 166 to control system air pressure between the preset maximum pressure level and the preset minimum pressure level. After operation of first governor 126 is restored, controller 156 returns to controlling first governor 126 to control system air pressure.

Figure 1A:
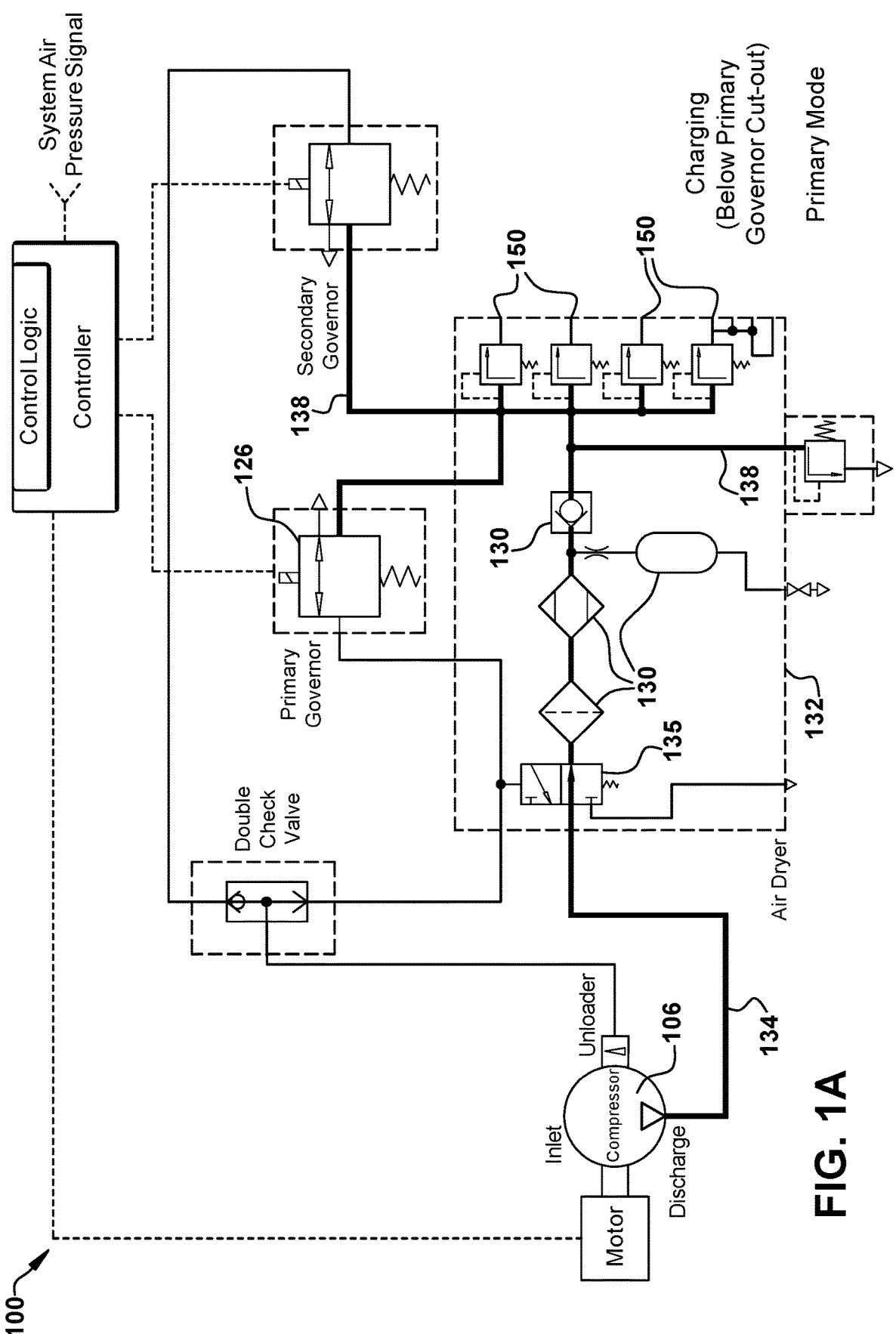

FIG. 1A shows components of the vehicle air brake charging system 100 in a primary mode of operation in which system 100 is charging (i.e., compressor 106 is loaded) due to system air pressure being below cut-in pressure of primary governor 126. When system 100 is charging, pressurized air in third passage 134 passes through the purge valve 135 and the other air dryer components 130 into fourth passage 138 to deliver pressurized air through delivery ports 150 of air dryer 132.

Figure 1B:
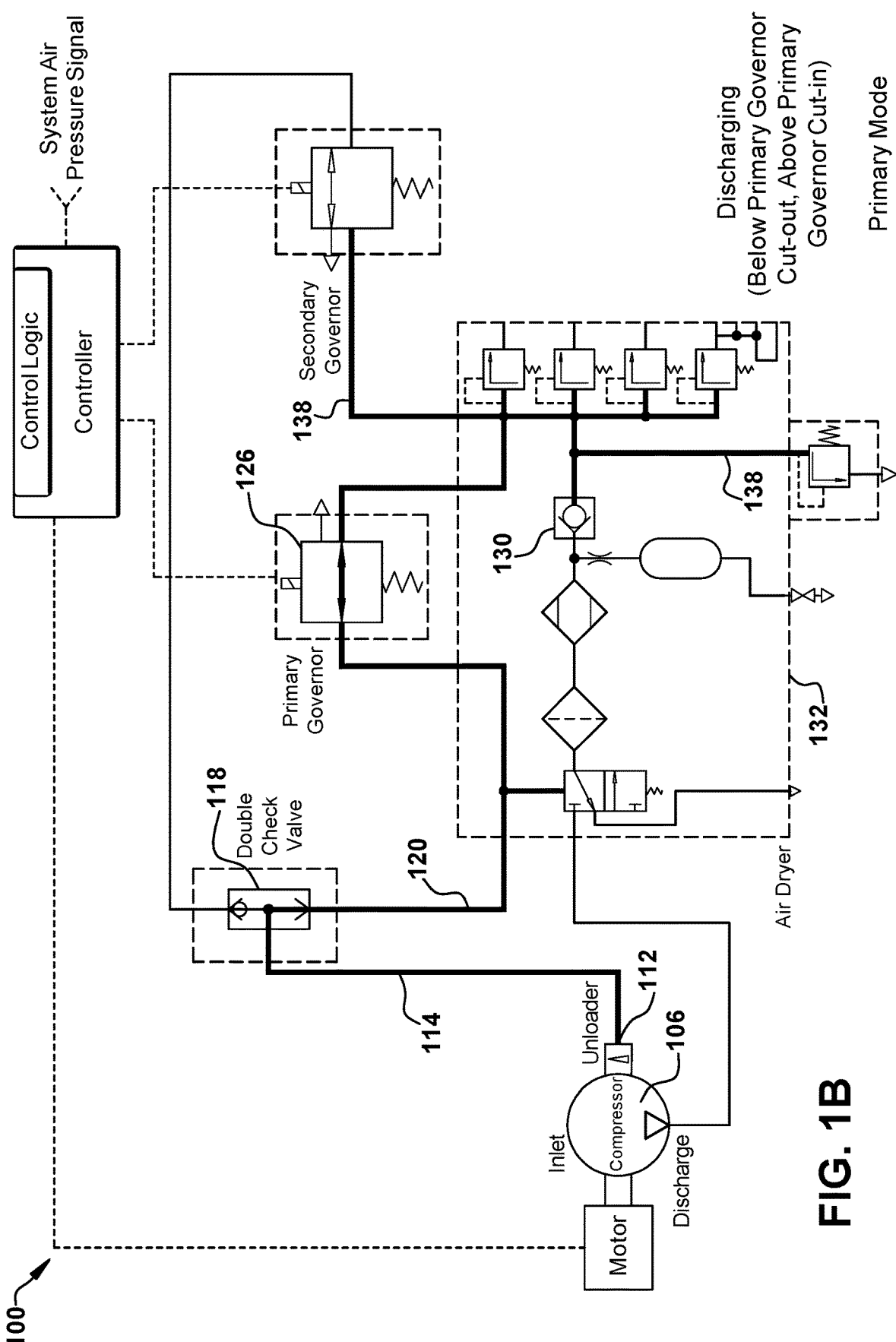

FIG. 1B shows components of the vehicle air brake charging system 100 in the primary mode of operation in which system 100 is discharging (i.e., compressor 106 is unloaded) due to system air pressure being below cut-out pressure of primary governor 126 and above cut-in pressure of primary governor 126. When system 100 is discharging, pressurized air in fourth passage 138 passes through primary governor 126 into second passage 120. The pressurized air then passes through double check valve 118 into first passage 114 to unloader port 112 of compressor 106.

Figure 1C:
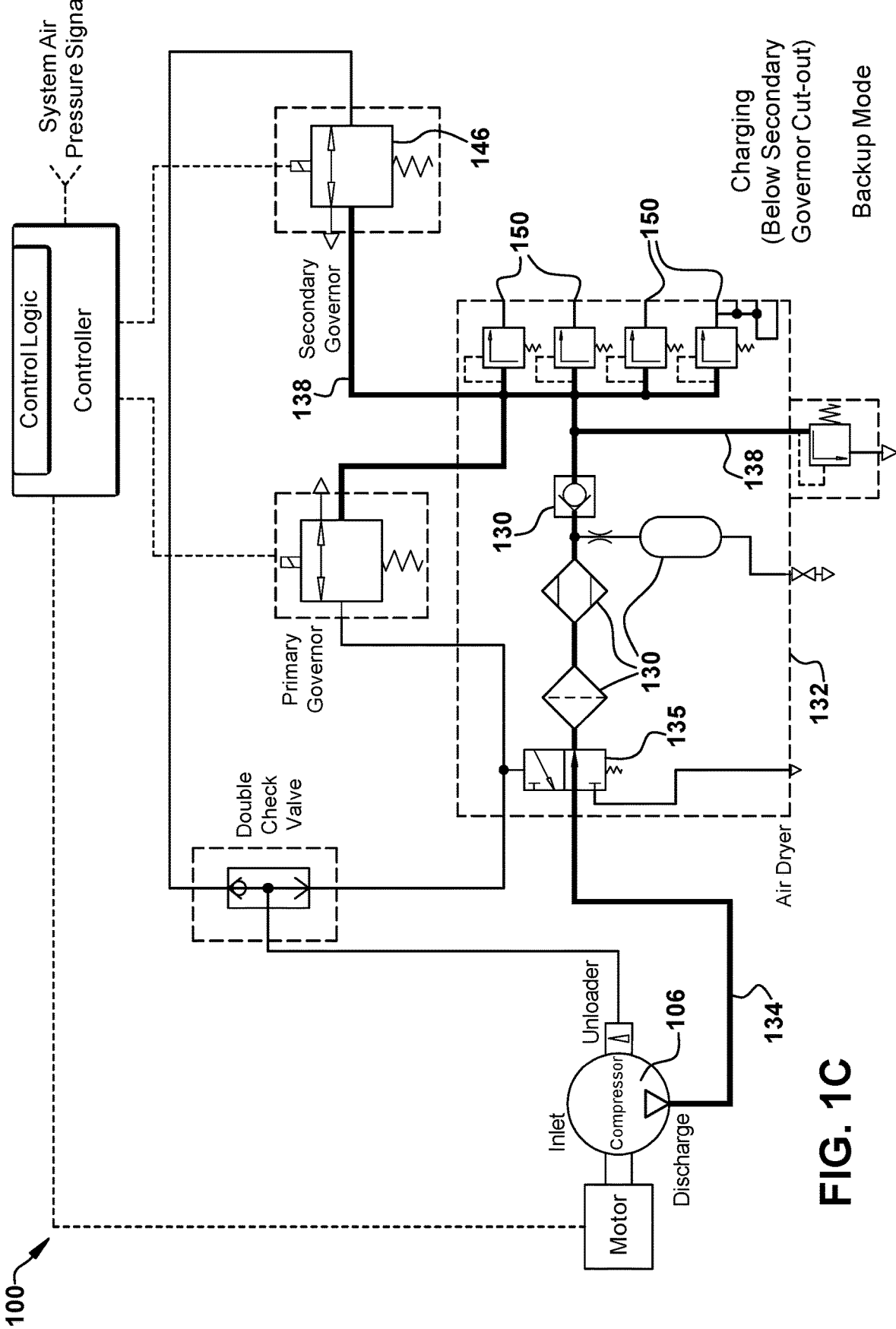

FIG. 1C shows components of the vehicle air brake charging system 100 in a backup mode of operation in which system 100 is charging due to system air pressure being below cut-out pressure of secondary governor 146. When system 100 is charging, pressurized air in third passage 134 passes through the purge valve 135 and the other air dryer components 130 into fourth passage 138 to deliver pressurized air through delivery ports 150 of air dryer 132.

Figure 1D:
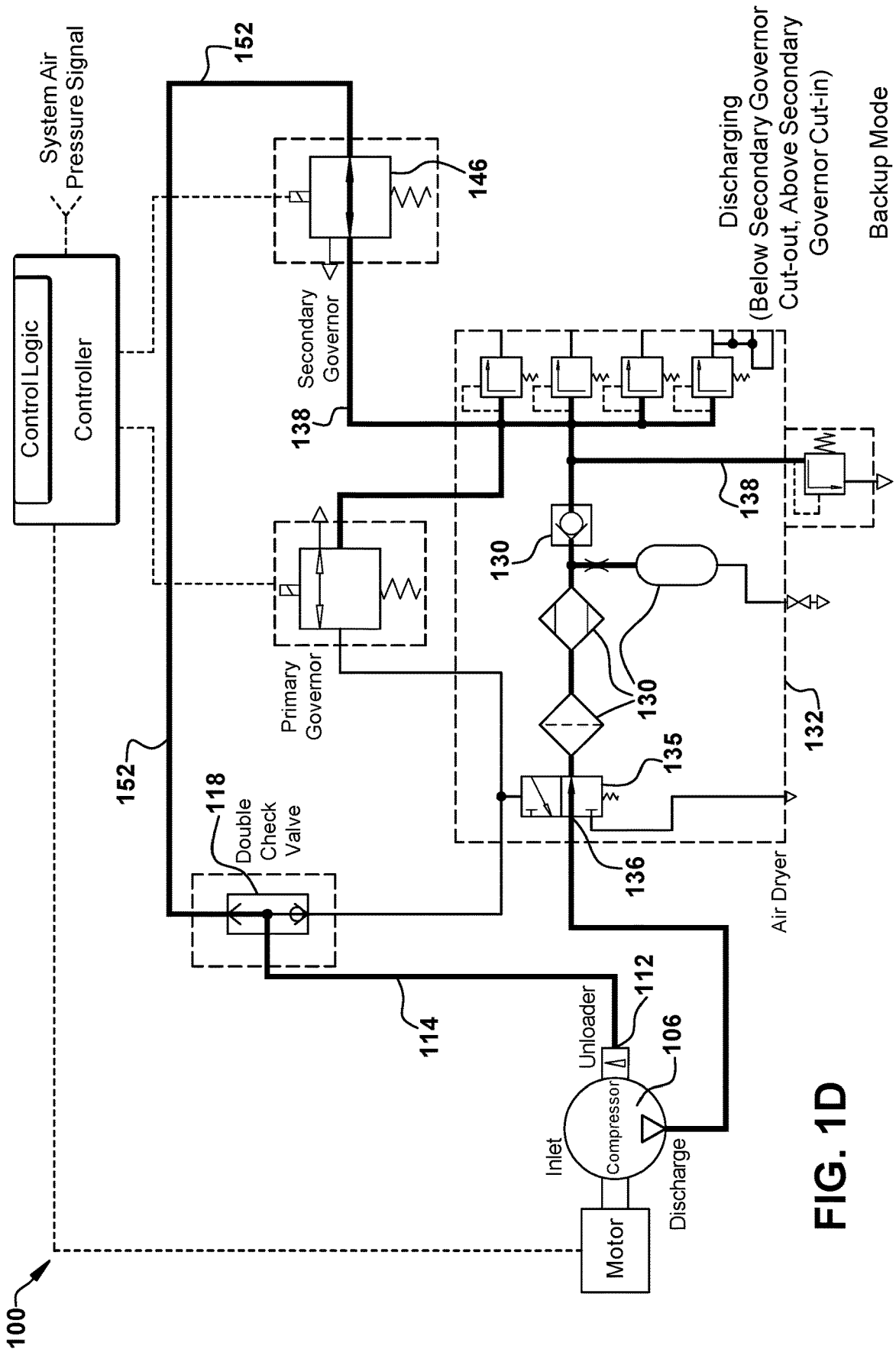

FIG. 1D shows components of the vehicle air brake charging system 100 in the backup mode of operation in which system 100 is discharging due to system air pressure being below cut-out pressure of secondary governor 146 and above cut-in pressure of secondary governor 146. When system 100 is discharging, pressurized air in fourth passage 138 passes through secondary governor 146 into fifth passage 152. The pressurized air then passes through double check valve 118 into first passage 114 to unloader port 112 of compressor 106.

As shown in FIG. 1D, pressurized air in third passage 134 also passes through the purge valve 135 and the other air dryer components 130 into fourth passage 138 to deliver pressurized air through delivery ports 150 of air dryer 132 (i.e., there is no purge cycle occurring while compressor 106 is unloaded in the backup mode). It is conceivable that a purge cycle can be provided in the backup mode of operation by connecting unloader port 112 of compressor 106 to control port 128 of the purge valve 135.

Referring to FIGS. 2, 2A, 2B, 2C, and 2D, schematic diagrams are shown of a vehicle air brake charging system 200 in different modes of operation and embodying an example redundant governor apparatus in accordance with a second embodiment. In particular, FIGS. 2, 2A, 2B, 2C, and 2D show a variation of certain pneumatic passage connections shown in FIGS. 1, 1A, 1B, 1C, and 1D. In FIGS. 2, 2A, 2B, 2C, and 2D, solid lines represent pneumatic passages between components, heavy solid lines (i.e., thicker solid lines) represent pressurized pneumatic passages between components, dashed lines represent electrical connections between components, and double-solid lines represent mechanical couplings between components.

Figure 2:
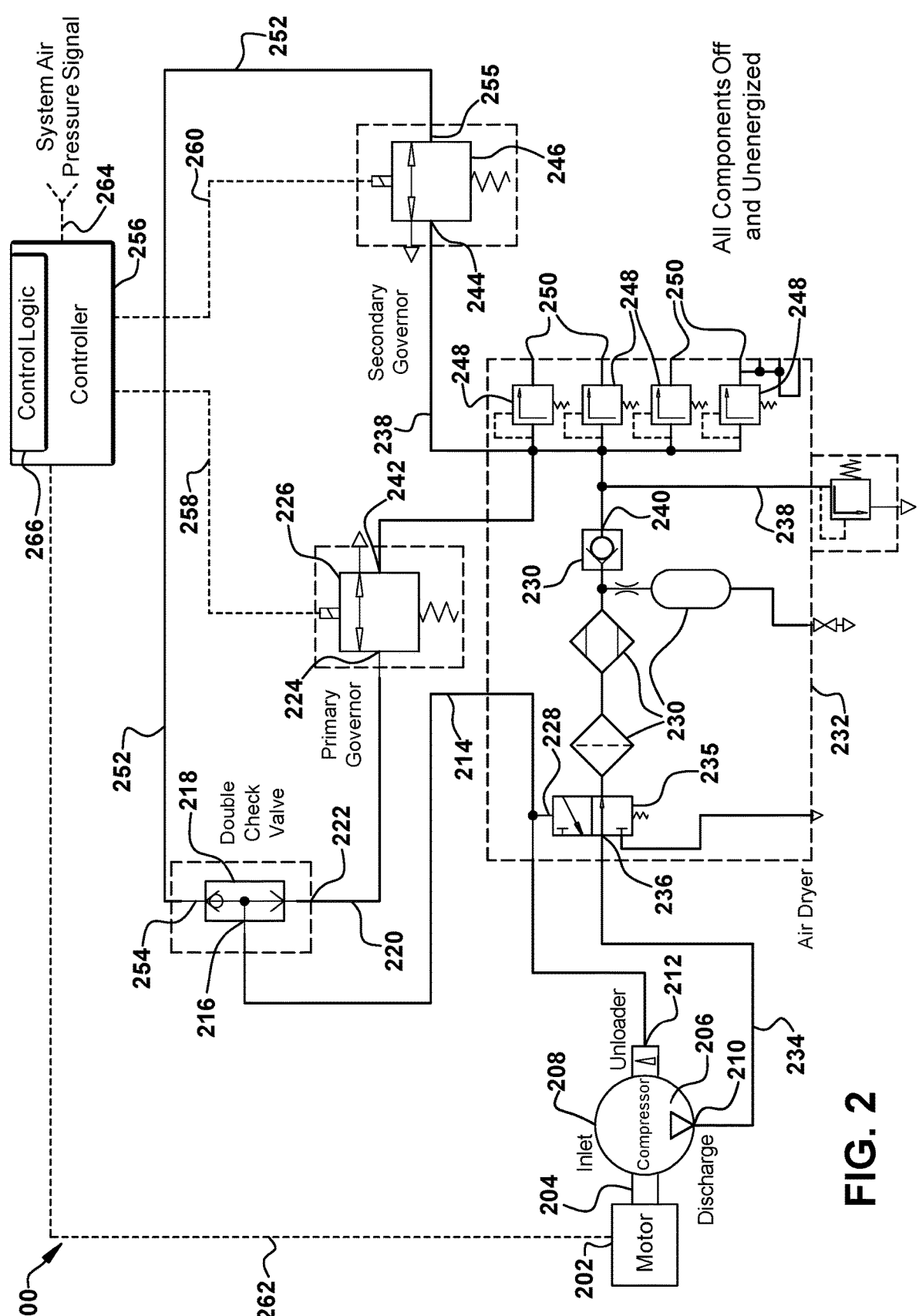
FIGS. 2, 2A, 2B, 2C, and 2D are schematic diagrams of a vehicle air brake charging system in different modes of operation and embodying an example redundant governor apparatus in accordance with a second embodiment.

FIG. 2 shows all components of the vehicle air brake charging system 200 in their off or unenergized states. Compressor motor 202 is coupled via coupling 204 to compressor 206 that has inlet port 208, discharge outlet port 210, and unloader port 212. First passage 214 connects unloader port 212 of compressor 206, outlet port 216 of double check valve 218, and control port 228 of a purge valve 235 within air dryer 232. Second passage 220 connects first inlet port 222 of double check valve 218 and outlet port 224 of primary governor 226 (i.e., a first governor). Structure and operation of purge valve 235 and other air dryer components 230 within an air dryer are known and conventional and, therefore, will not be described.

Third passage 234 connects discharge outlet port 210 of compressor 206 and inlet port 236 of the purge valve 235 within air dryer 232. Fourth passage 238 connects outlet port 240 of the air dryer components 230, inlet port 242 of primary governor 226, inlet port 244 of secondary governor 246 (i.e., a second governor), and through a number of pressure protection components 248 within air dryer 232 to corresponding delivery ports 250 that are connectable to air braking system and air accessories (not shown) of the vehicle. Structure and operation of pressure protection components within an air dryer are known and conventional and, therefore, will not be described. Fifth passage 252 connects second inlet port 254 of double check valve 218 and outlet port 255 of secondary governor 246.

Controller 256 controls primary governor 226 via line 258, secondary governor 246 via line 260, and compressor motor 202 via line 262. In some embodiments, compressor motor 202 may comprise the vehicle engine. In some embodiments, compressor 206 may be electronic or independent from compressor motor 202. In this case, compressor motor 202 can be turned on/off directly without unloading compressor 206.

Controller 256 monitors system air pressure signal via line 264 and controls primary governor 226, secondary governor 246, and compressor motor 202 based upon control logic 266 that is stored in a data storage unit of controller 256. System air pressure signal on line 264 may be received from any type of pressure sensor on the vehicle. Controller 256 also monitors operation of first and second governors 226, 246. When controller 256 detects failure of first governor 226 to operate, controller 256 controls second governor 246 based upon control logic 266 to control system air pressure between the preset maximum pressure level and the preset minimum pressure level. After operation of first governor 226 is restored, controller 256 returns to controlling first governor 226 to control system air pressure.

Figure 2A:
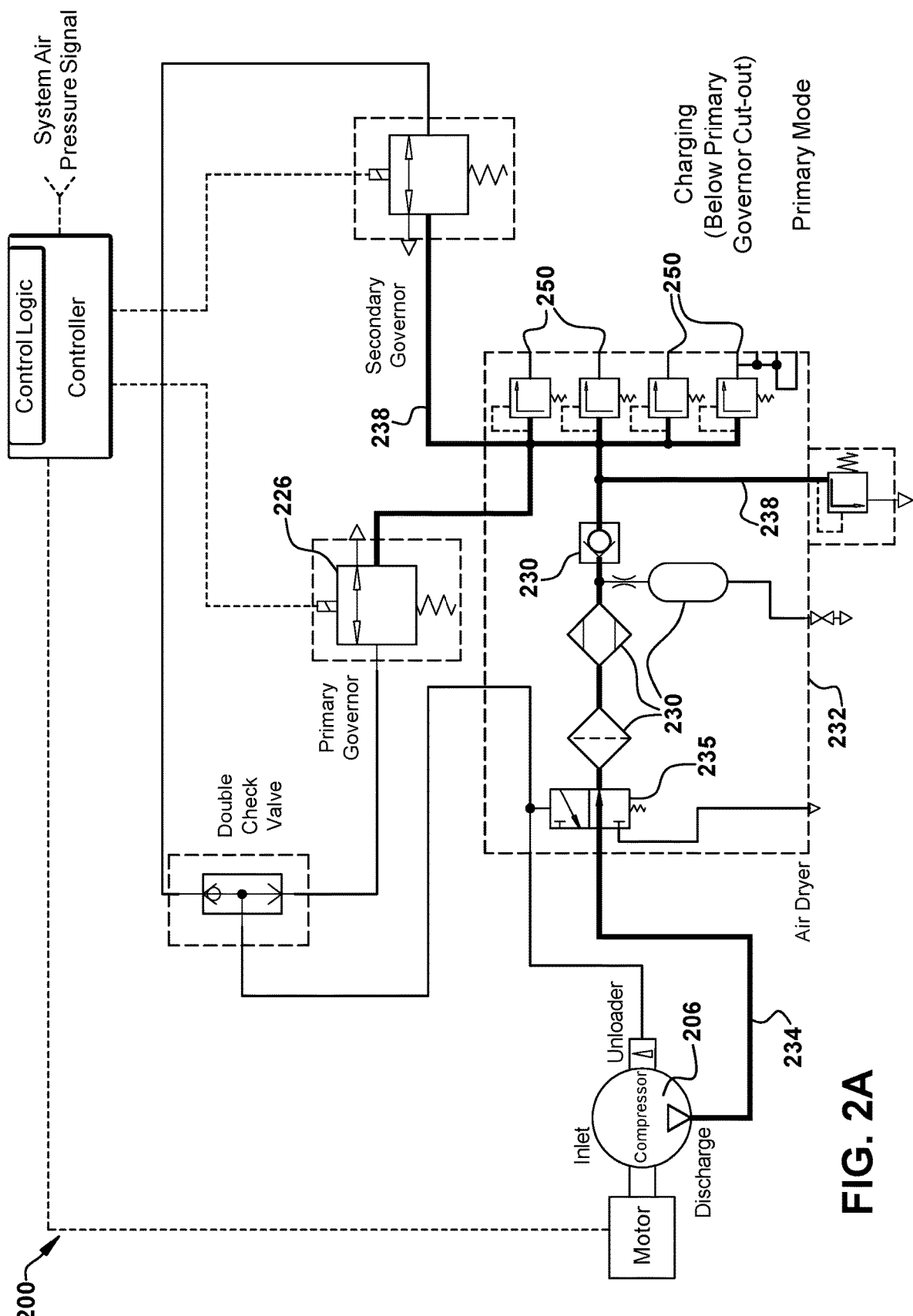

FIG. 2A shows components of the vehicle air brake charging system 200 in a primary mode of operation in which system 200 is charging (i.e., compressor 206 is loaded) due to system air pressure being below cut-in pressure of primary governor 226. When system 200 is charging, pressurized air in third passage 234 passes through the purge valve 235 and the other air dryer components 230 into fourth passage 238 to deliver pressurized air through delivery ports 250 of air dryer 232.

Figure 2B:
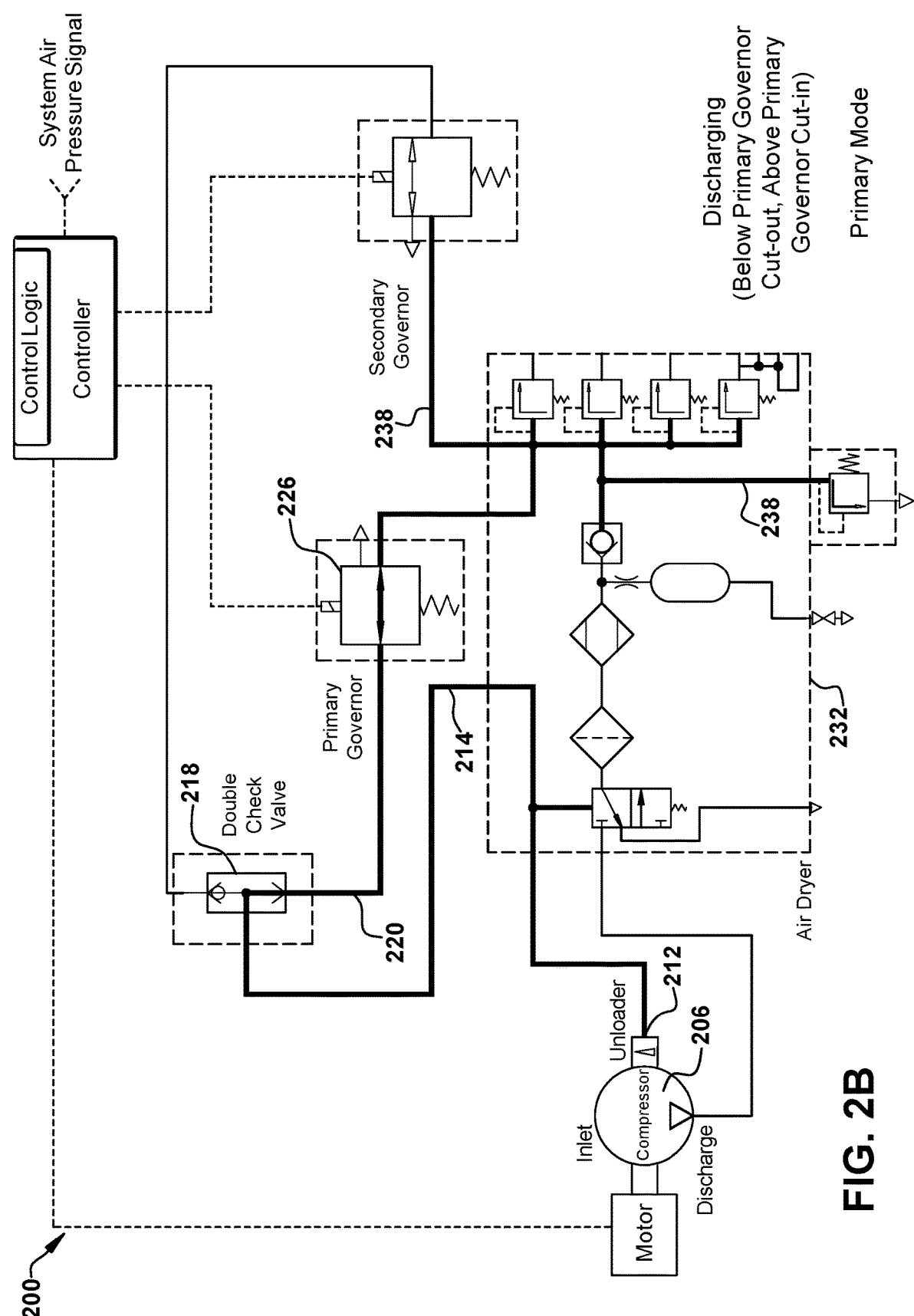

FIG. 2B shows components of the vehicle air brake charging system 200 in the primary mode of operation in which system 200 is discharging (i.e., compressor 206 is unloaded) due to system air pressure being below cut-out pressure of primary governor 226 and above cut-in pressure of primary governor 226. When system 206 is discharging, pressurized air in fourth passage 238 passes through primary governor 226 into second passage 220. The pressurized air then passes through double check valve 218 into first passage 214 to unloader port 212 of compressor 206.

Figure 2C:
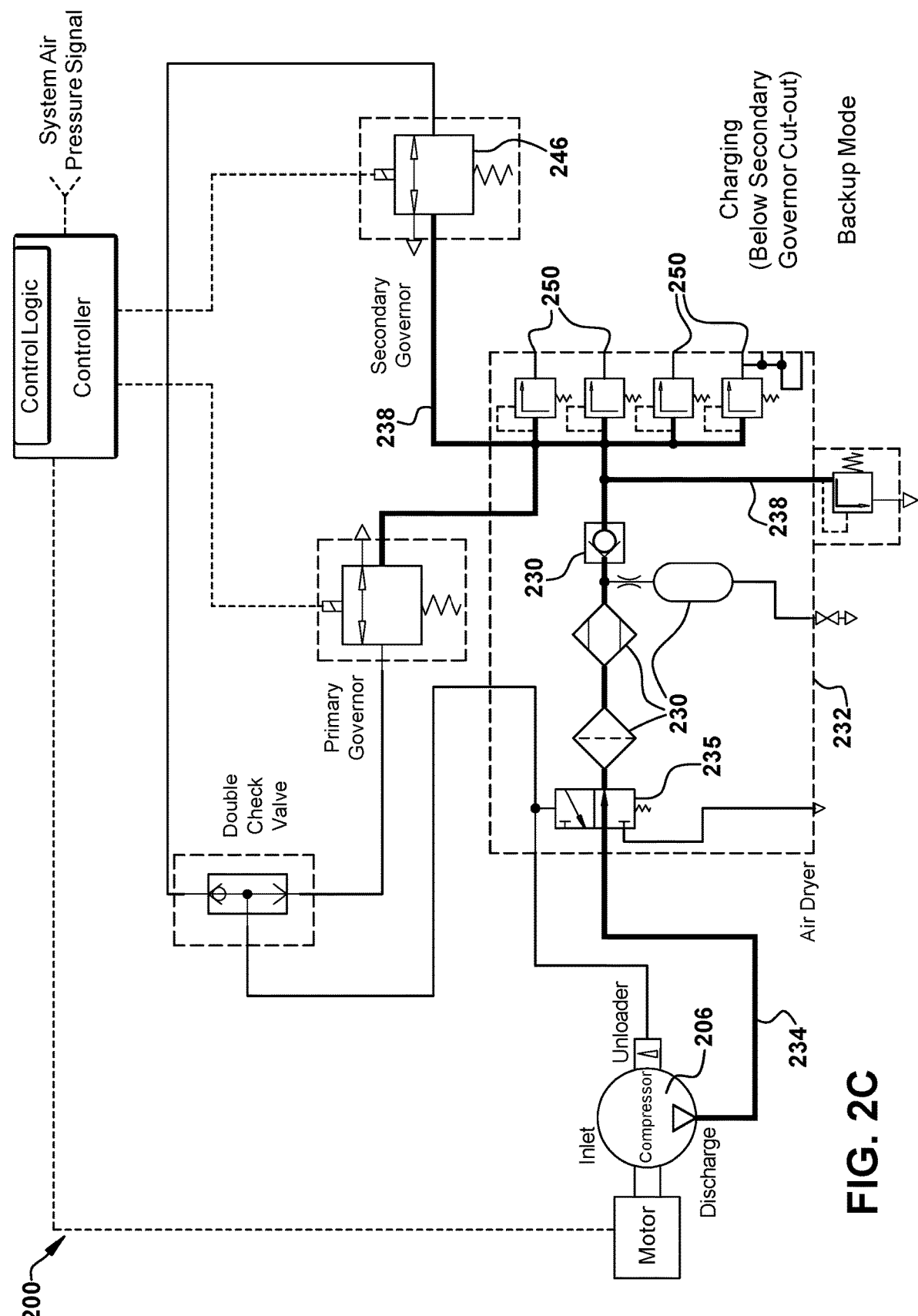

FIG. 2C shows components of the vehicle air brake charging system 200 in a backup mode of operation in which system 200 is charging due to system air pressure being below cut-out pressure of secondary governor 246. When system 200 is charging, pressurized air in third passage 234 passes through the purge valve 235 and the other air dryer components 230 into fourth passage 238 to deliver pressurized air through delivery ports 250 of air dryer 232.

Figure 2D:
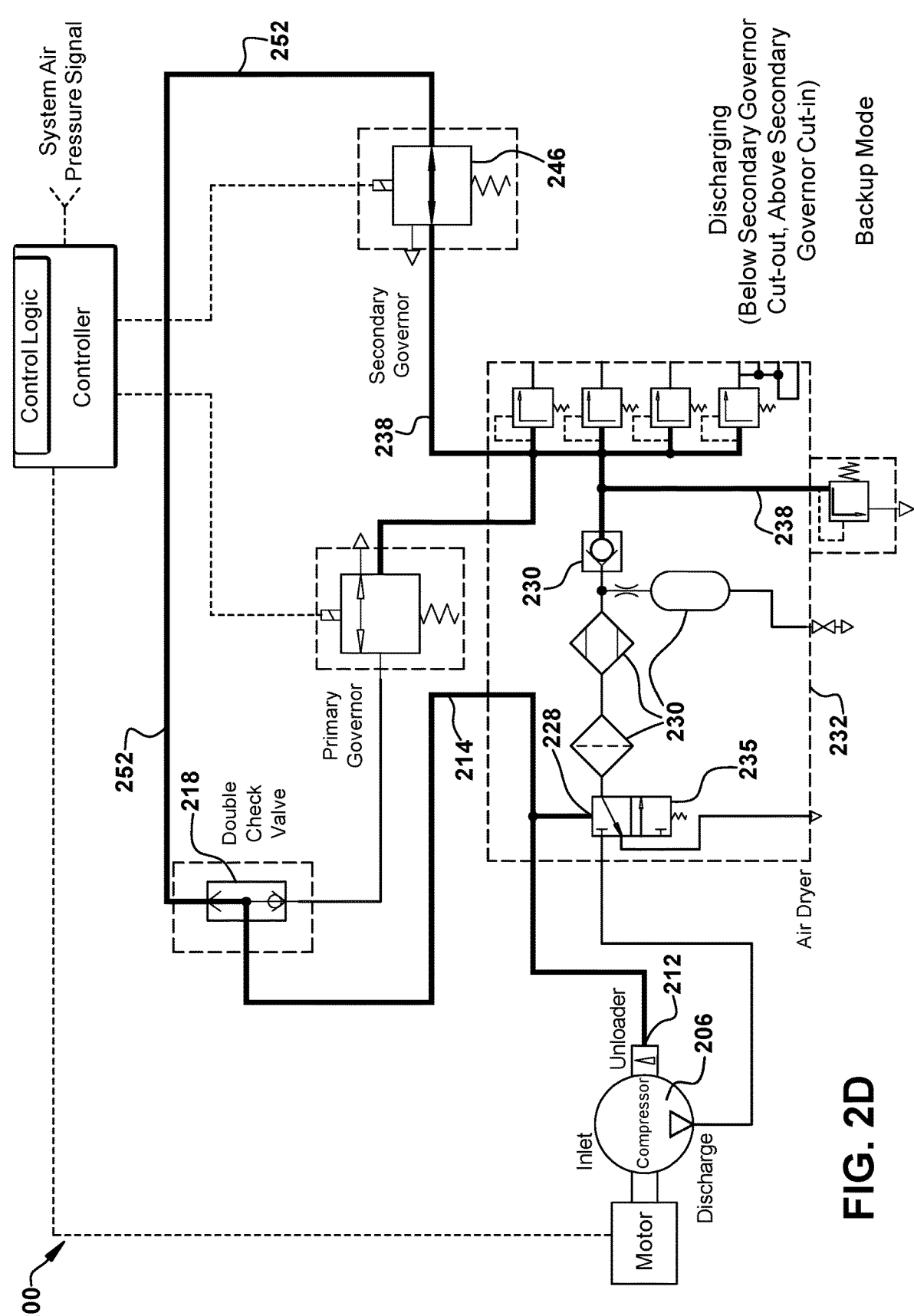

FIG. 2D shows components of the vehicle air brake charging system 200 in the backup mode of operation in which system 200 is discharging due to system air pressure being below cut-out pressure of secondary governor 246 and above cut-in pressure of secondary governor 246. When system 200 is discharging, pressurized air in fourth passage 238 passes through secondary governor 246 into fifth passage 252. The pressurized air then passes through double check valve 218 into first passage 214 to unloader port 212 of compressor 206. Since the pressurized air in first passage 214 also passes through air dryer 232 and is applied to control port 228 of the purge valve 235, the air dryer 232 also purges during the backup mode of operation of the vehicle air brake charging system 200.

Figure 3:
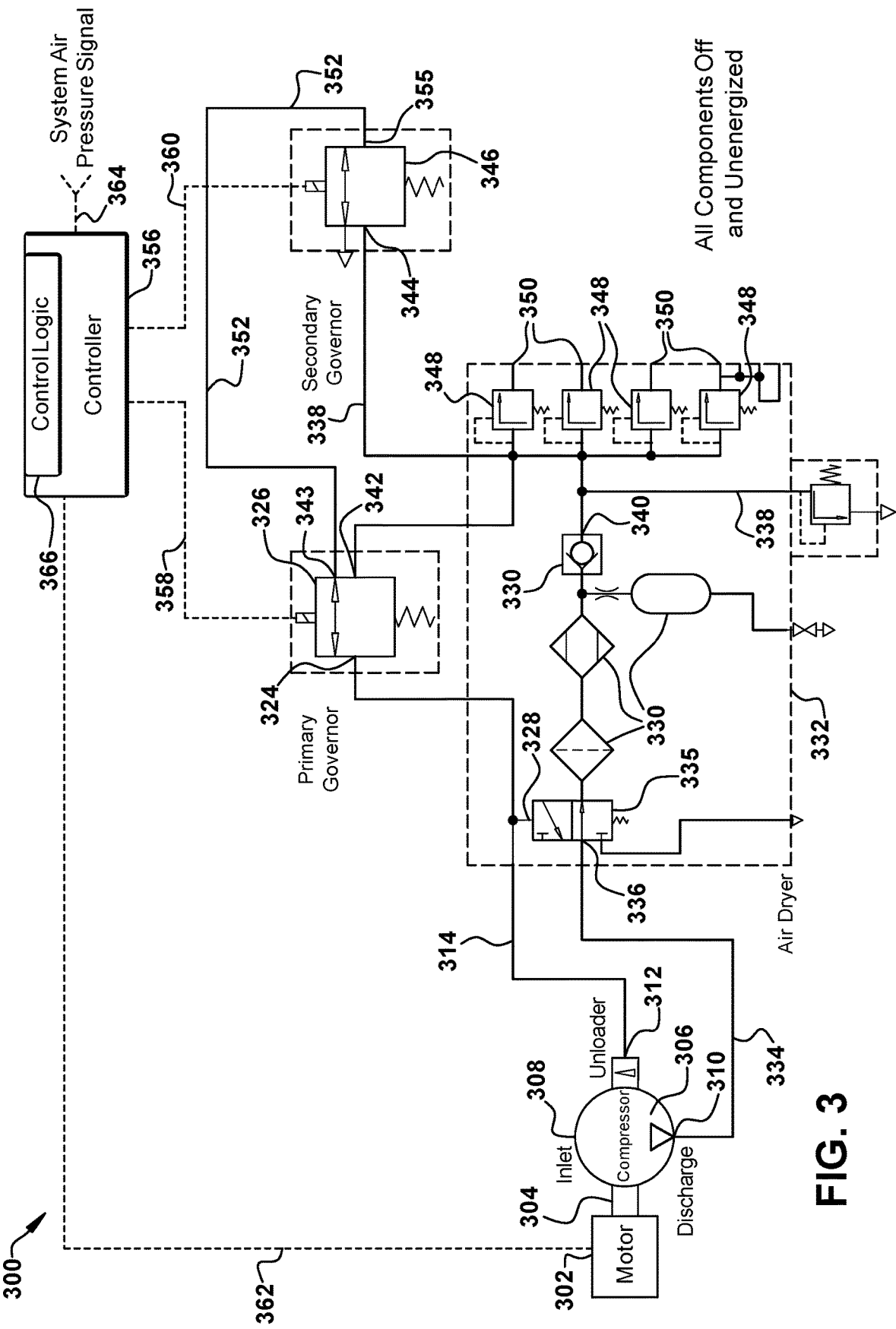
FIGS. 3, 3A, 3B, 3C, and 3D are schematic diagrams of a vehicle air brake charging system in different modes of operation and embodying an example redundant governor apparatus in accordance with a third embodiment.

Referring to FIGS. 3, 3A, 3B, 3C, and 3D, schematic diagrams are shown of a vehicle air brake charging system 300 in different modes of operation and embodying an example redundant governor apparatus in accordance with a third embodiment. In FIG. 3, solid lines represent pneumatic passages between components, heavy solid lines (i.e., thicker solid lines) represent pressurized pneumatic passages between components, dashed lines represent electrical connections between components, and double-solid lines represent mechanical couplings between components.

FIG. 3 shows all components of the vehicle air brake charging system 300 in their off or unenergized states. Compressor motor 302 is coupled via coupling 304 to compressor 306 that has inlet port 308, discharge outlet port 310, and unloader port 312. First passage 314 connects unloader port 312 of compressor 306, outlet port 324 of primary governor 326 (i.e., a first governor), and control port 328 of purge valve 335 within air dryer 332. Structure and operation of purge valve 335 and other air dryer components 330 within an air dryer are known and conventional and, therefore, will not be described. Second passage 352 connects first inlet port 343 of primary governor 326 and outlet port 355 of secondary governor 346 (i.e., a second governor).

Third passage 334 connects discharge outlet port 310 of compressor 306 and inlet port 336 of the purge valve 335 within air dryer 332. Fourth passage 338 connects outlet port 340 of the air dryer components 330, second inlet port 342 of primary governor 326, inlet port 344 of secondary governor 346, and through a number of pressure protection components 348 within air dryer 332 to corresponding delivery ports 350 that are connectable to air braking system and air accessories (not shown) of the vehicle. Structure and operation of pressure protection components within an air dryer are known and conventional and, therefore, will not be described.

Controller 356 controls primary governor 326 via line 358, secondary governor 346 via line 360, and compressor motor 302 via line 362. In some embodiments, compressor motor 302 may comprise the vehicle engine. In some embodiments, compressor 306 may be electronic or independent from compressor motor 302. In this case, compressor motor 302 can be turned on/off directly without unloading compressor 306.

Controller 356 monitors system pressure signal via line 364 and controls primary governor 326, secondary governor 346, and compressor motor 302 based upon control logic 366 that is stored in a data storage unit of controller 356. System air pressure signal on line 364 may be received from any type of pressure sensor on the vehicle. Controller 356 also monitors operation of first and second governors 326, 346. When controller 356 detects failure of first governor 326 to operate, controller 356 controls second governor 346 based upon control logic 366 to control system air pressure between the preset maximum pressure level and the preset minimum pressure level. After operation of first governor 326 is restored, controller 356 returns to controlling first governor 326 to control system air pressure.

Figure 3A:
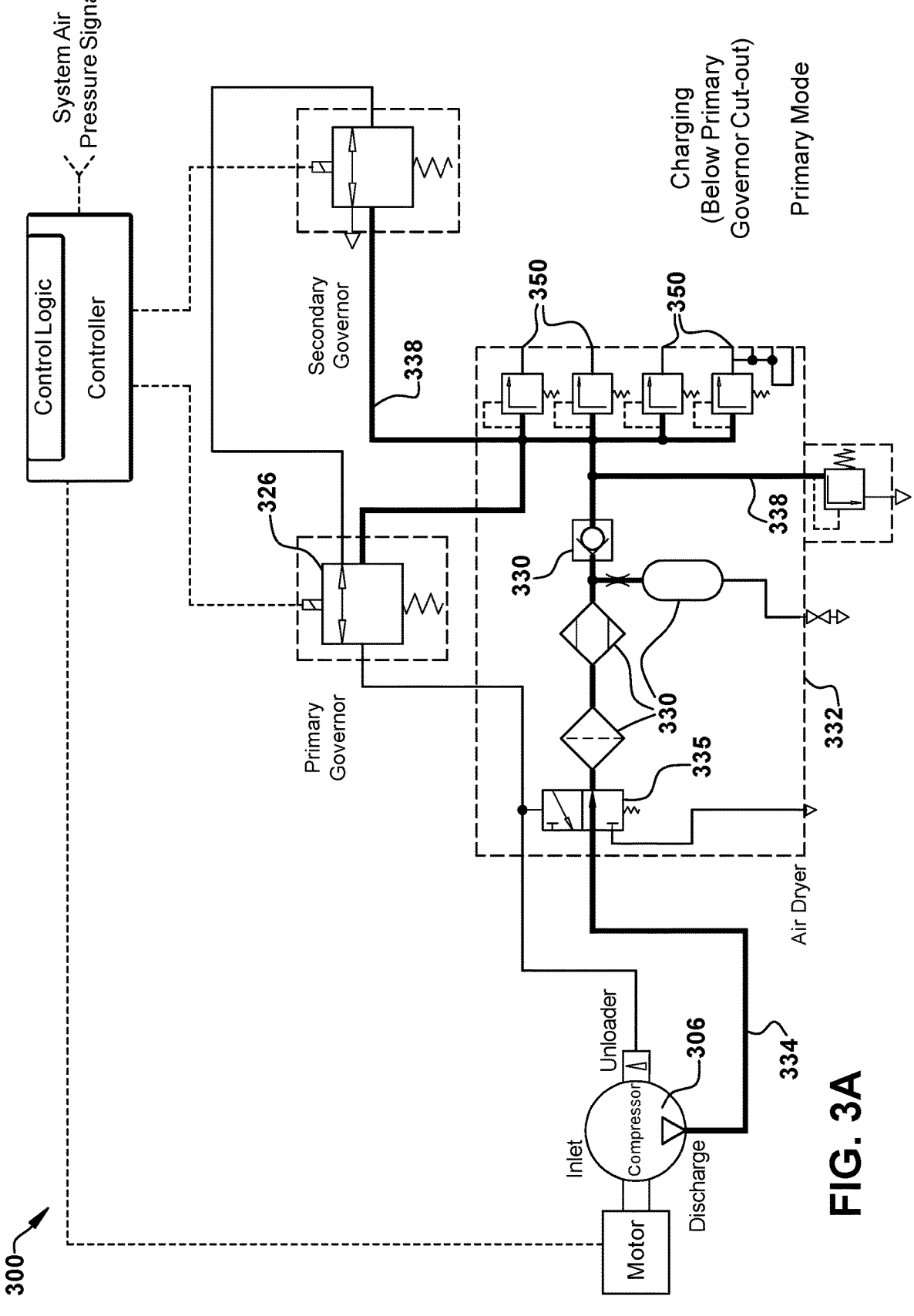

FIG. 3A shows components of the vehicle air brake charging system 300 in a primary mode of operation in which system 300 is charging (i.e., compressor 306 is loaded) due to system air pressure being below cut-in pressure of primary governor 326. When system 300 is charging, pressurized air in third passage 334 passes through the purge valve 335 and the other air dryer components 330 into fourth passage 338 to deliver pressurized air through delivery ports 350 of air dryer 332.

Figure 3B:
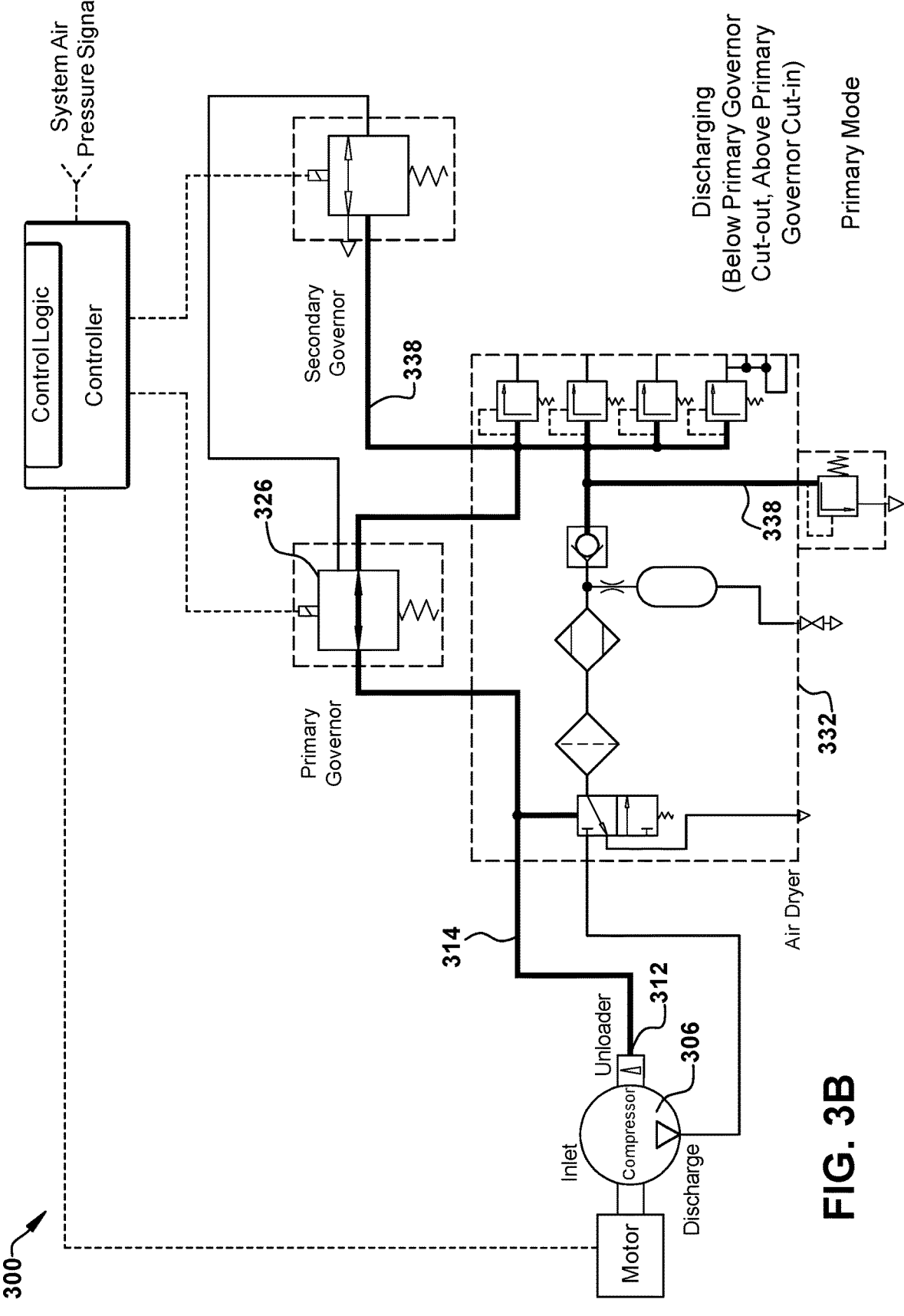

FIG. 3B shows components of the vehicle air brake charging system 300 in the primary mode of operation in which system 300 is discharging (i.e., compressor 306 is unloaded) due to system air pressure being below cut-out pressure of primary governor 326 and above cut-in pressure of primary governor 326. When system 300 is discharging, pressurized air in fourth passage 338 passes through primary governor 326 into first passage 314 to unloader port 312 of compressor 306.

Figure 3C:
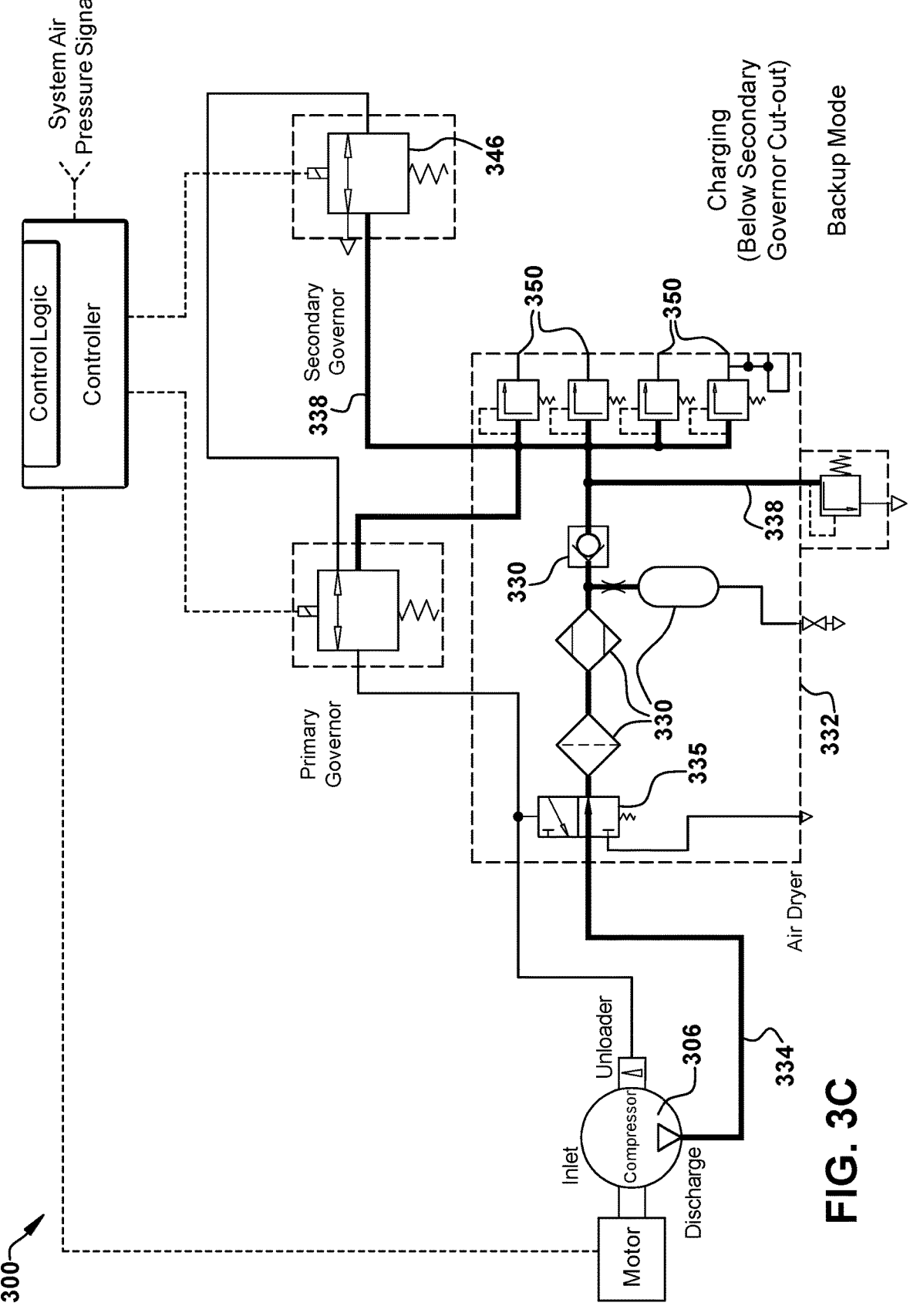

FIG. 3C shows components of the vehicle air brake charging system 300 in a backup mode of operation in which system 300 is charging due to system air pressure being below cut-out pressure of secondary governor 346. When system 300 is charging, pressurized air in third passage 334 passes through the purge valve 335 and the other air dryer components 330 into fourth passage 338 to deliver pressurized air through delivery ports 350 of air dryer 332.

Figure 3D:
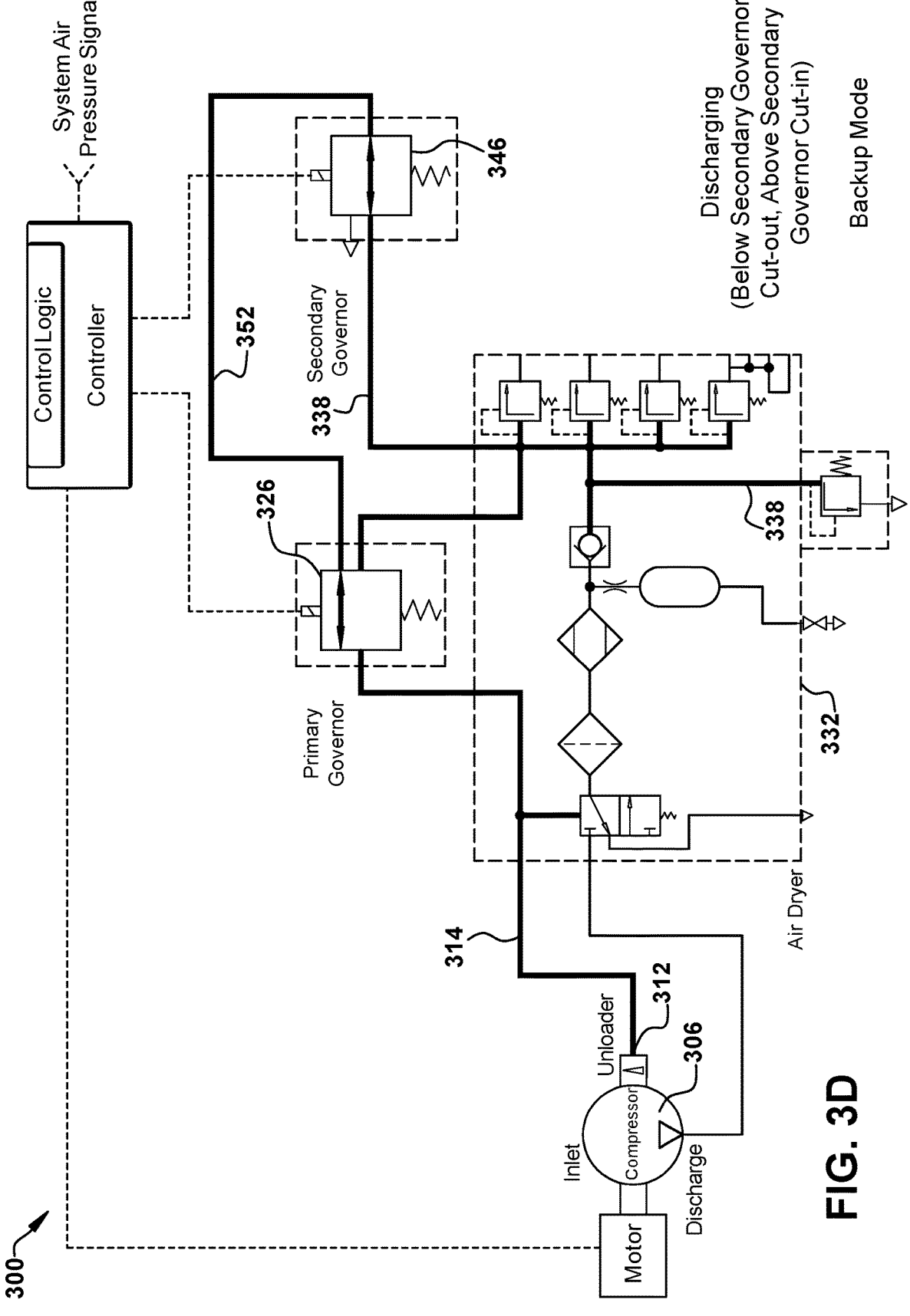

FIG. 3D shows components of the vehicle air brake charging system 300 in the backup mode of operation in which system 300 is discharging due to system air pressure being below cut-out pressure of secondary governor 346 and above cut-in pressure of secondary governor 346. When system 300 is discharging, pressurized air in fourth passage 338 passes through secondary governor 346 into second passage 352. The pressurized air in second passage 352 then passes through primary governor 326 into first passage 314 to unloader port 312 of compressor 306.

Referring to FIGS. 4, 4A, 4B, 4C, and 4D, schematic diagrams are shown of a vehicle air brake charging system 400 in different modes of operation and embodying an example redundant governor apparatus in accordance with a fourth embodiment. In FIGS. 4, 4A, 4B, 4C, and 4D, solid lines represent pneumatic passages between components, heavy solid lines (i.e., thicker solid lines) represent pressurized pneumatic passages between components, dashed lines represent electrical connections between components, and double-solid lines represent mechanical couplings between components.

Figure 4:
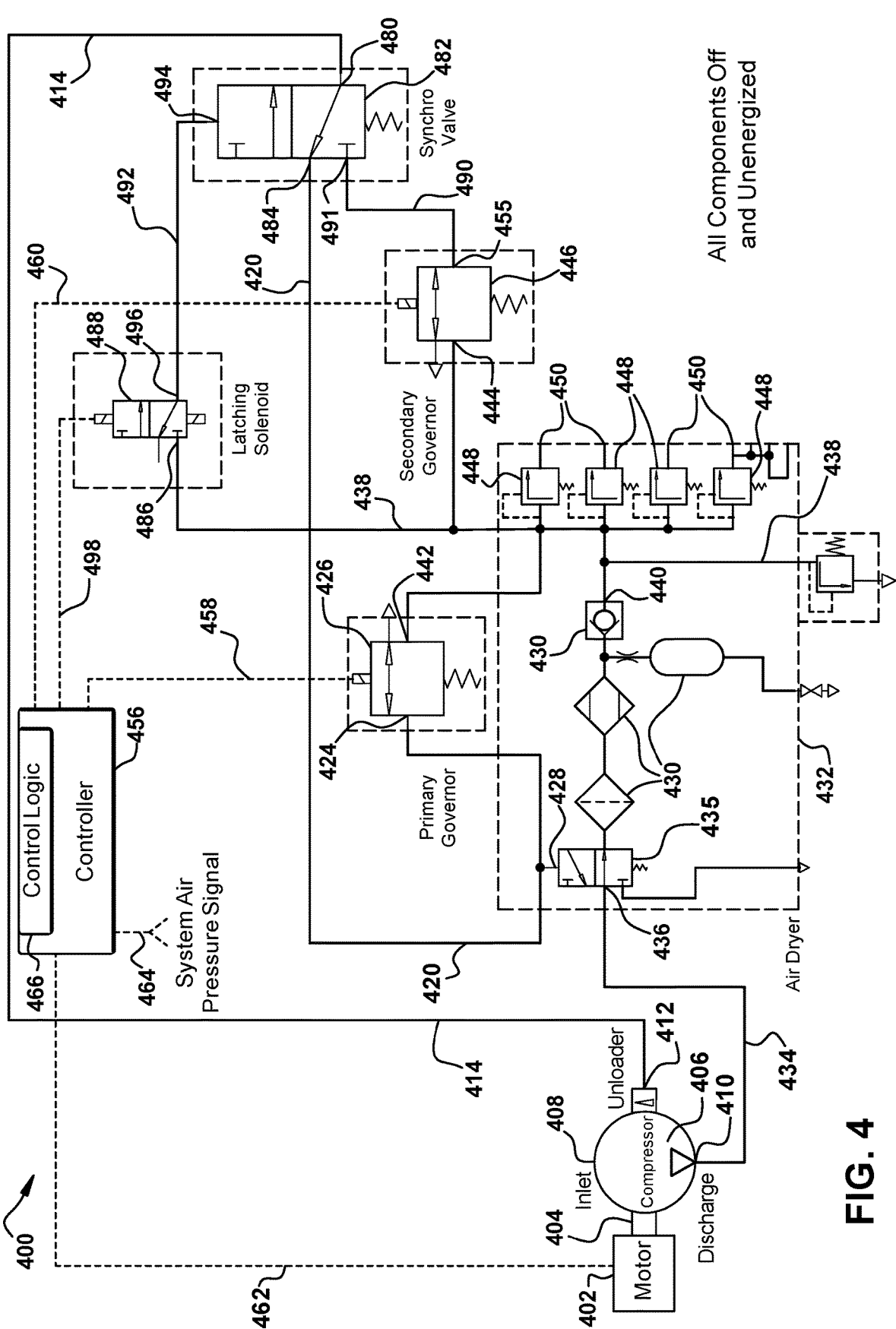
FIGS. 4, 4A, 4B, 4C, and 4D are schematic diagrams of a vehicle air brake charging system in different modes of operation and embodying an example redundant governor apparatus in accordance with a fourth embodiment.

FIG. 4 shows all components of the vehicle air brake charging system 400 in their off or unenergized states. Compressor motor 402 is coupled via coupling 404 to compressor 406 that has inlet port 408, discharge outlet port 410, and unloader port 412. First passage 414 connects unloader port 412 of compressor 406 and delivery port 480 of synchro valve 482. Second passage 420 connects exhaust port 484 of synchro valve 482, outlet port 424 of primary governor 426 (i.e., a first governor), and control port 428 of a purge valve 435 within air dryer 432. Structure and operation of purge valve 435 and other air dryer components 430 within an air dryer are known and conventional and, therefore, will not be described.

Third passage 434 connects discharge outlet port 410 of compressor 406 and inlet port 436 of the purge valve 435 within air dryer 432. Fourth passage 438 connects outlet port 440 of the air dryer components 430, inlet port 442 of primary governor 426, inlet port 444 of secondary governor 446 (i.e., a second governor), first port 486 of latching solenoid 488, and through a number of pressure protection components 448 within air dryer 432 to corresponding delivery ports 450 that are connectable to air braking system and air accessories (not shown) of the vehicle. Structure and operation of pressure protection components within an air dryer are known and conventional and, therefore, will not be described.

Fifth passage 490 connects supply port 491 of synchro valve 482 and outlet port 455 of secondary governor 446. Sixth passage 492 connects control port 494 of synchro valve 482 and second port 496 of latching solenoid 488. Structure and operation of synchro valves are known and conventional and, therefore, will not be described. An example synchro valve that can be used is model SV-1, which is commercially available from Bendix Commercial Vehicle Systems located in Avon, Ohio. Latching solenoid 488 and synchro valve 482 cooperate to support each of the first and second governors 426, 446 to be selected to act as primary or backup.

Controller 456 controls primary governor 426 via line 458, secondary governor 446 via line 460, latching solenoid 488 via line 498, and compressor motor 402 via line 462. In some embodiments, compressor motor 402 may comprise the vehicle engine. In some embodiments, compressor 406 may be electronic or independent from compressor motor 402. In this case, compressor motor 402 can be turned on/off directly without unloading compressor 406.

Controller 456 monitors system pressure signal via line 464 and controls primary governor 426, secondary governor 446, latching solenoid 488, and compressor motor 402 based upon control logic 466 that is stored in a data storage unit of controller 456. System air pressure signal on line 464 may be received from any type of pressure sensor on the vehicle. Controller 456 also monitors operation of first and second governors 426, 446. When controller 456 detects failure of first governor 426 to operate, controller 456 controls second governor 446 and latching solenoid 488 based upon control logic 466 to control system air pressure between the preset maximum pressure level and the preset minimum pressure level. After operation of first governor 426 is restored, controller 456 returns to controlling first governor 426 to control system air pressure.

Figure 4A:
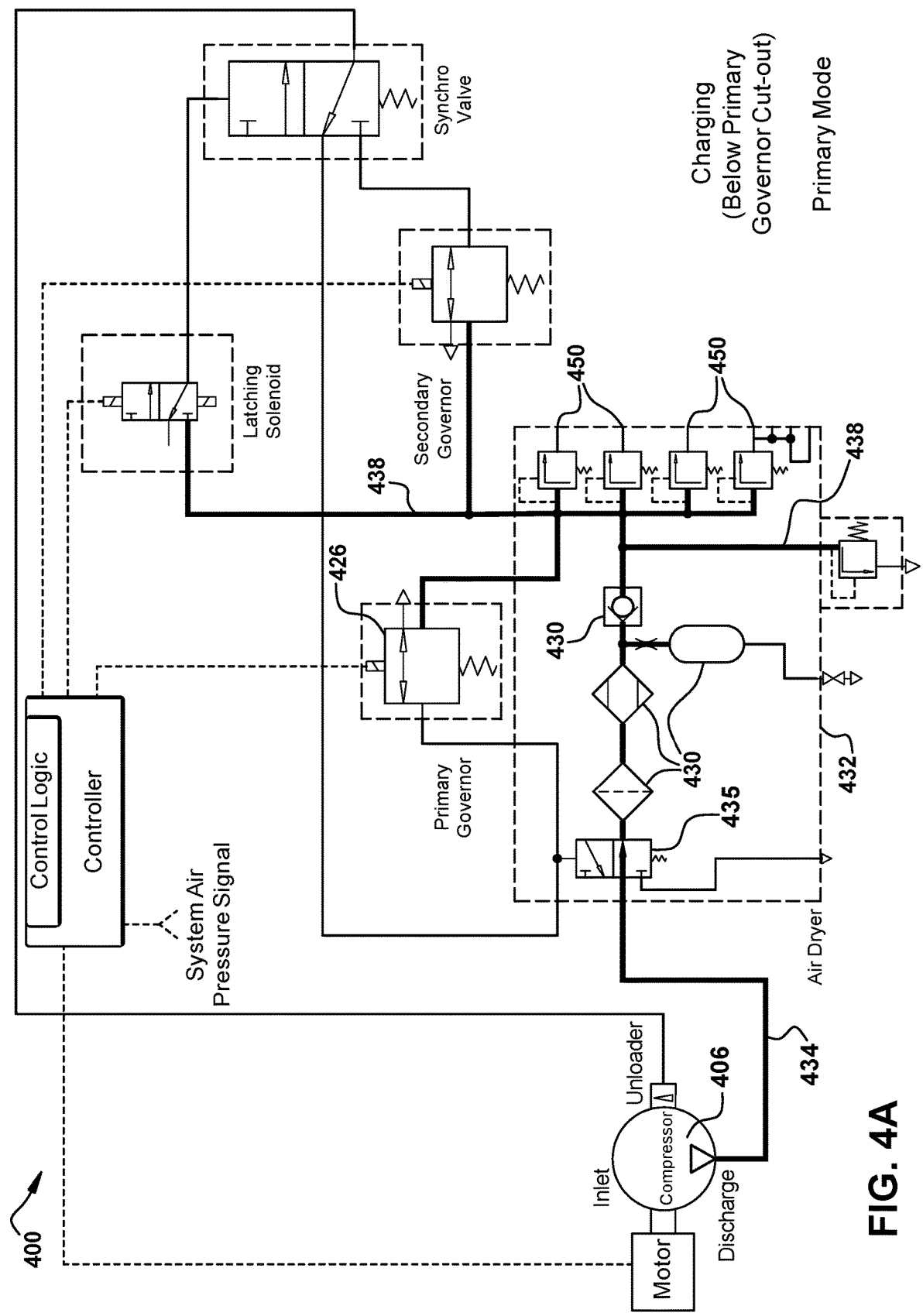

FIG. 4A shows components of the vehicle air brake charging system 400 in a primary mode of operation in which system 400 is charging (i.e., compressor 406 is loaded) due to system air pressure being below cut-in pressure of primary governor 426. When system 400 is charging, pressurized air in third passage 434 passes through the purge valve 435 and the other air dryer components 430 into fourth passage 438 to deliver pressurized air through delivery ports 450 of air dryer 432.

Figure 4B:
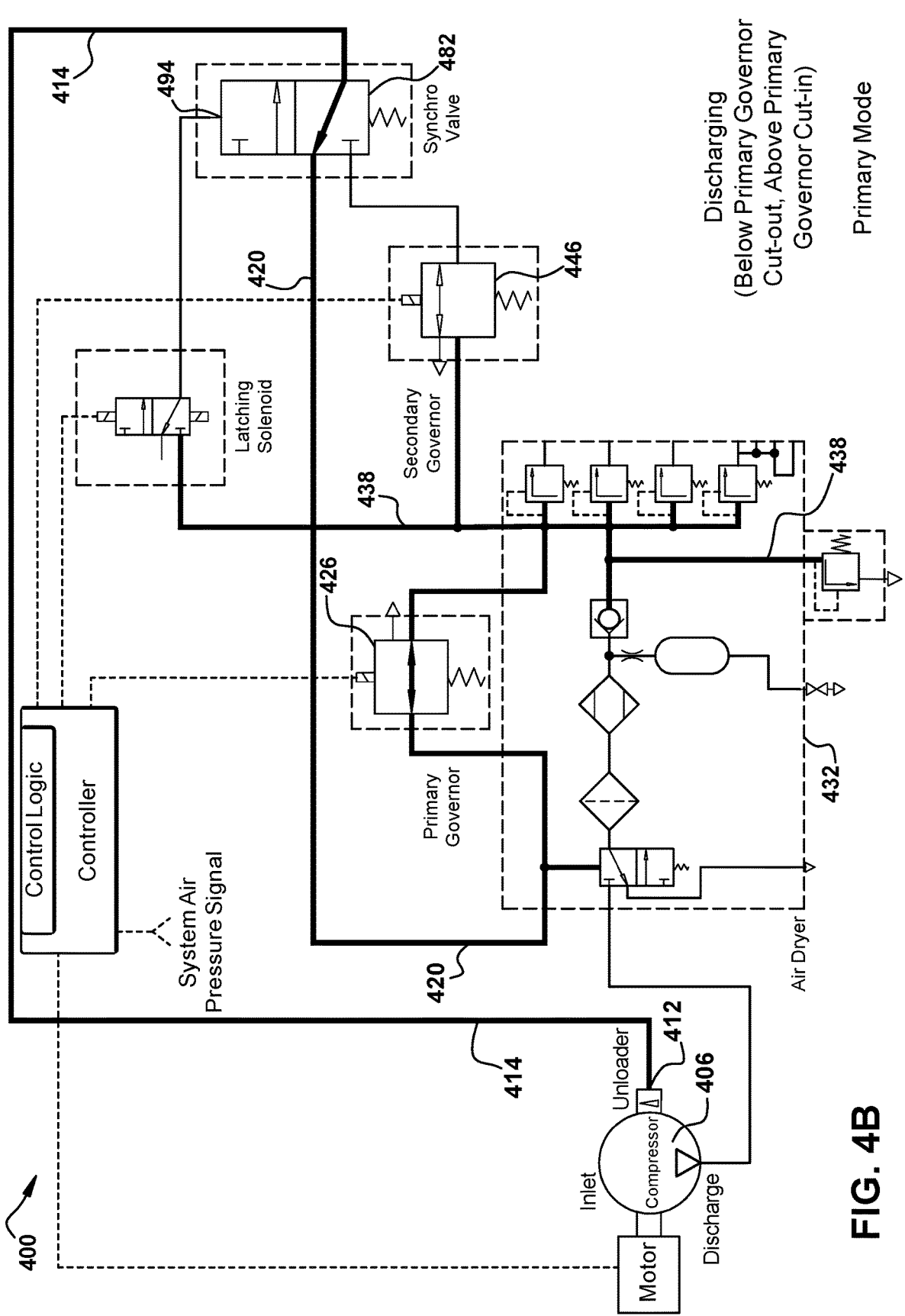

FIG. 4B shows components of the vehicle air brake charging system 400 in the primary mode of operation in which system 400 is discharging (i.e., compressor 406 is unloaded) due to system air pressure being below cut-out pressure of primary governor 426 and above cut-in pressure of primary governor 426. When system 400 is discharging, pressurized air in fourth passage 438 passes through primary governor 426 into second passage 420. The pressurized air then passes through synchro valve 482 without restriction into first passage 414 since latching solenoid 488 is controlled to be in its position shown in FIG. 4B. The pressurized air in first passage 414 is applied to unloader port 412 of compressor 406. Due to lack of pressurized air on control port 494 of synchro valve 482, the state of secondary governor 446 is ignored.

Figure 4C:
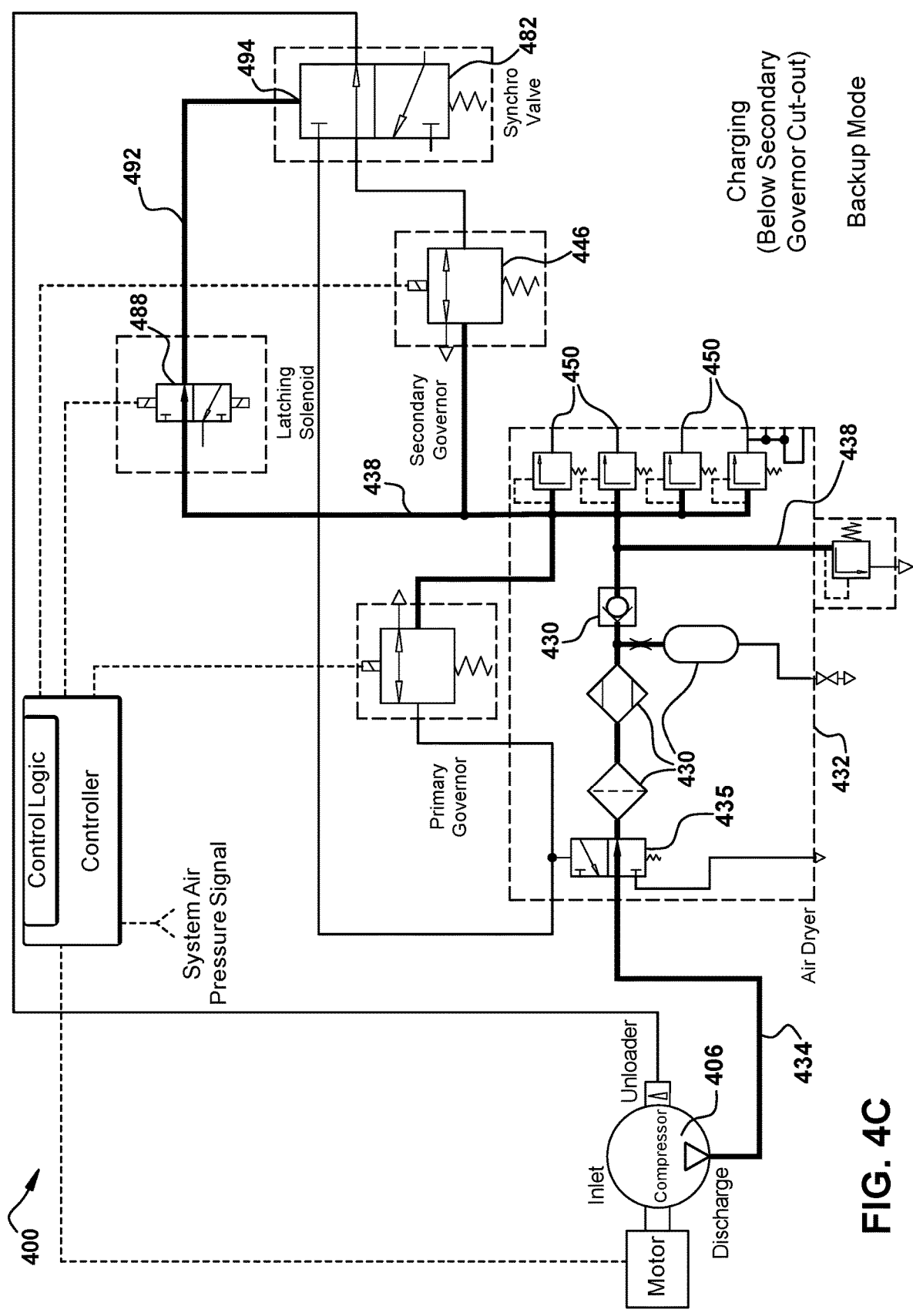

FIG. 4C shows components of the vehicle air brake charging system 400 in a backup mode of operation in which system 400 is charging due to system air pressure being below cut-out pressure of secondary governor 446. When system 400 is charging, pressurized air in third passage 434 passes through the purge valve 435 and the other air dryer components 430 into fourth passage 438 to deliver pressurized air through delivery ports 450 of air dryer 432. During backup mode of operation, latching solenoid 488 is controlled to be in its position shown in FIG. 4C. When latching solenoid 488 is in this position, pressurized air in fourth passage 438 passes through latching solenoid 488 to sixth passage 492 to control port 494 of synchro valve 482. Latching solenoid 488 remains in the position shown in FIG. 4C during the backup mode of operation. As is known, a latching solenoid requires power to change states, but not to maintain a state. Accordingly, latching solenoid 488 of FIG. 4C provides robustness against unforeseen events (e.g., a loss of power) during the backup mode of operation.

Figure 4D:
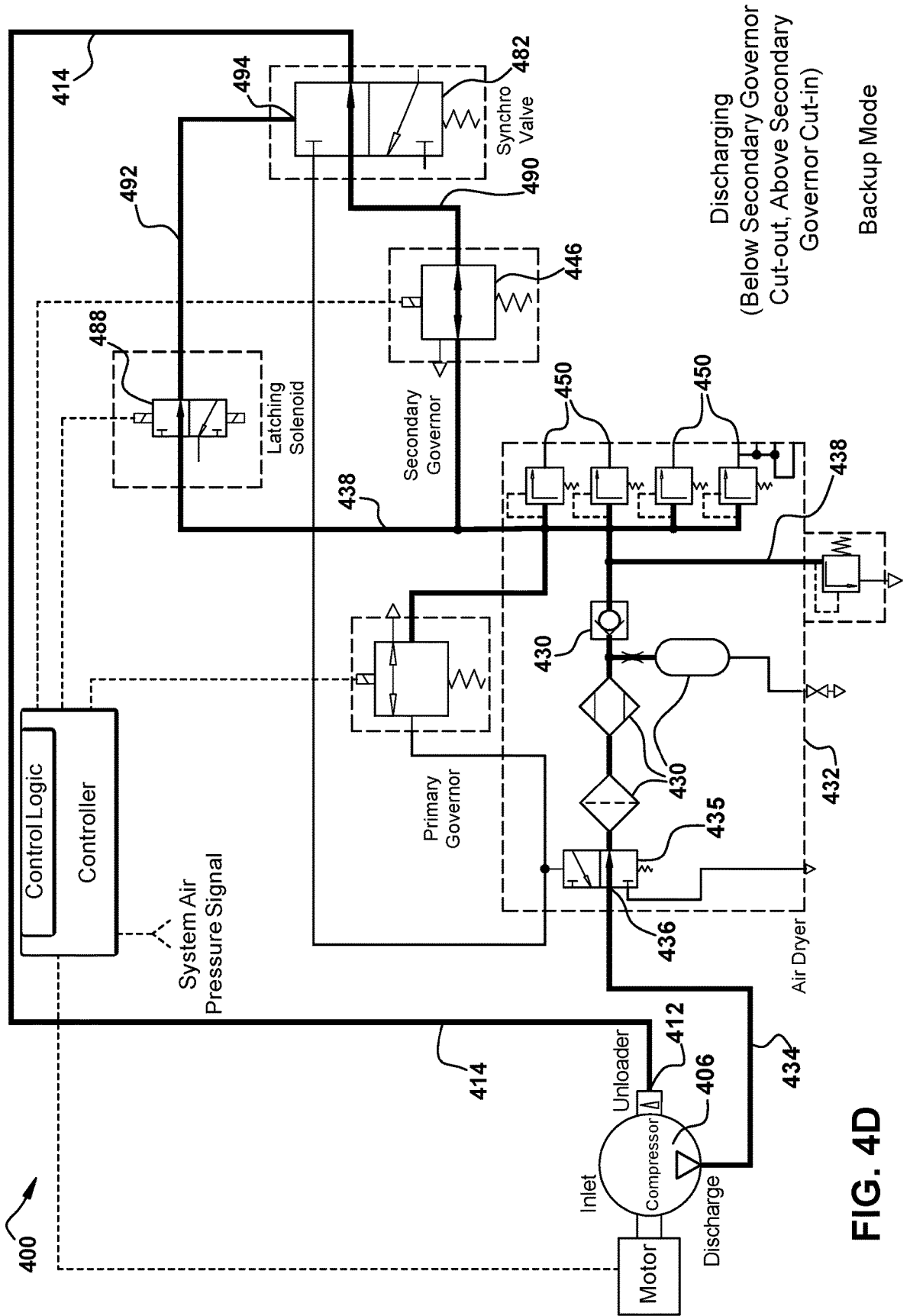

FIG. 4D shows components of the vehicle air brake charging system 400 in the backup mode of operation in which system 400 is discharging due to system air pressure being below cut-out pressure of secondary governor 446 and above cut-in pressure of secondary governor 446. When compressor 406 is discharging, pressurized air in fourth passage 438 passes through secondary governor 446 into fifth passage 490. Since latching solenoid 488 is in its position shown in FIG. 4D, the pressurized air in sixth passage 492 applied to control port 494 of synchro valve 482 maintains synchro valve 482 in its position shown in FIG. 4D. The pressurized air in fifth passage 490 then passes through synchro valve 482 into first passage 414 to unloader port 412 of compressor 406.

As shown in FIG. 4D, pressurized air in third passage 434 also passes through the purge valve 435 and the other air dryer components 430 into fourth passage 438 to deliver pressurized air through delivery ports 450 of air dryer 432 (i.e., there is no purge cycle occurring while compressor 406 is unloaded in the backup mode). It is conceivable that a purge cycle can be provided in the backup mode of operation by connecting unloader port 412 of compressor 406 to control port 428 of the purge valve 435.

Referring to FIGS. 5, 5A, 5B, 5C, and 5D, schematic diagrams are shown of a vehicle air brake charging system 500 in different modes of operation and embodying an example redundant governor apparatus in accordance with a fifth embodiment. In particular, FIGS. 5, 5A, 5B, 5C, and 5D show a variation of certain pneumatic passage connections shown in FIGS. 4, 4A, 4B, 4C, and 4D. In FIGS. 4, 4A, 4B, 4C, and 4D, solid lines represent pneumatic passages between components, heavy solid lines (i.e., thicker solid lines) represent pressurized pneumatic passages between components, dashed lines represent electrical connections between components, and double-solid lines represent mechanical couplings between components.

Figure 5:
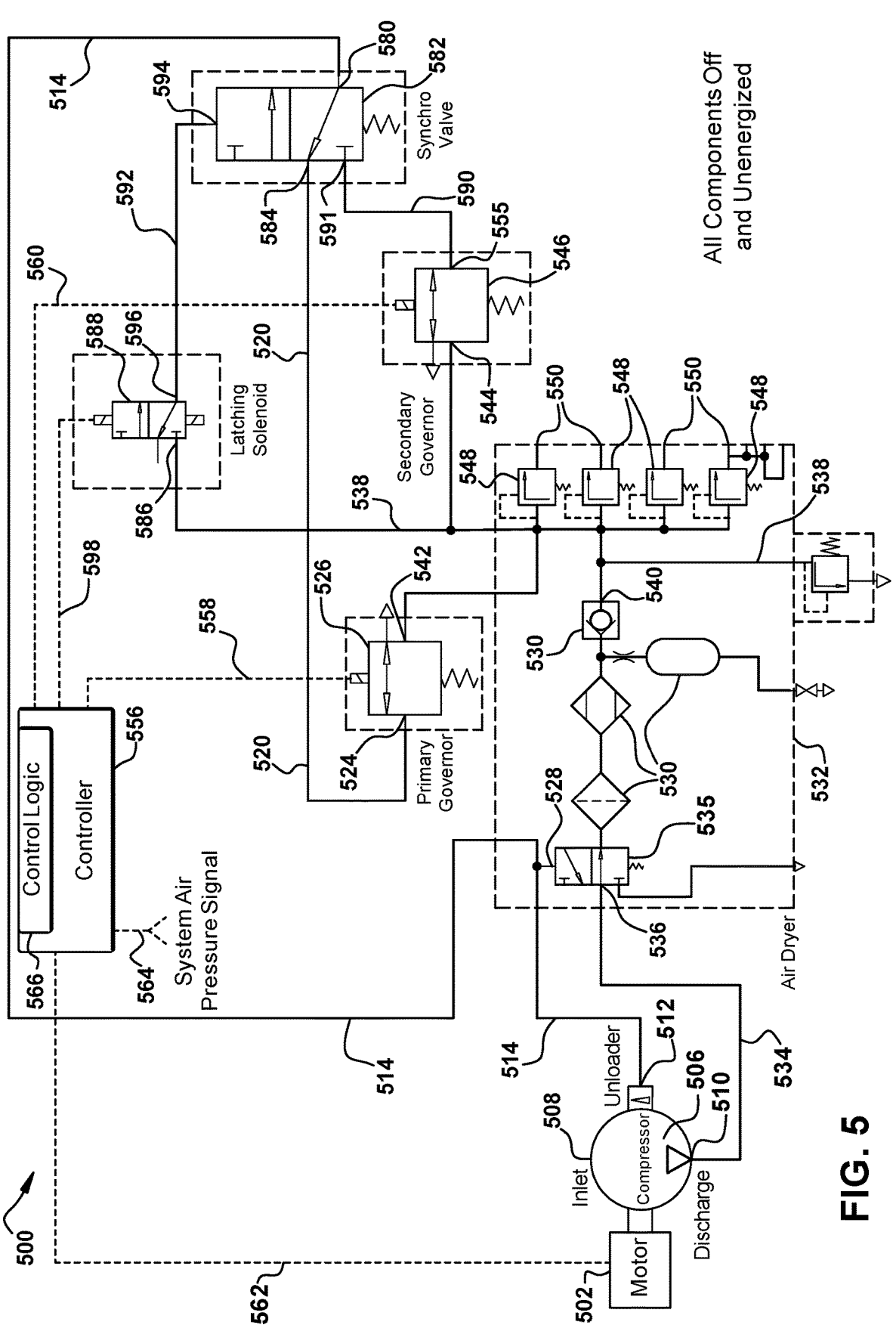
FIGS. 5, 5A, 5B, 5C, and 5D are schematic diagrams of a vehicle air brake charging system in different modes of operation and embodying an example redundant governor apparatus in accordance with a fifth embodiment.

FIG. 5 shows all components of the vehicle air brake charging system 500 in their off or unenergized states. Compressor motor 502 is coupled via coupling 504 to compressor 506 that has inlet port 508, discharge outlet port 510, and unloader port 512. First passage 514 connects unloader port 512 of compressor 506, delivery port 580 of synchro valve 582, and control port 528 of purge valve 535 within air dryer 532. Structure and operation of purge valve 535 and other air dryer components 530 within an air dryer are known and conventional and, therefore, will not be described. Second passage 520 connects exhaust port 584 of synchro valve 582, and outlet port 524 of primary governor 526 (i.e., a first governor).

Third passage 534 connects discharge outlet port 510 of compressor 506 and inlet port 536 of the purge valve 535 within air dryer 532. Fourth passage 538 connects outlet port 540 of the air dryer components 530, inlet port 542 of primary governor 526, inlet port 544 of secondary governor 546 (i.e., a second governor), first port 586 of latching solenoid 588, and through a number of pressure protection components 548 within air dryer 532 to corresponding delivery ports 550 that are connectable to air braking system and air accessories (not shown) of the vehicle. Structure and operation of pressure protection components within an air dryer are known and conventional and, therefore, will not be described.

Fifth passage 590 connects supply port 591 of synchro valve 582 and outlet port 555 of secondary governor 546. Sixth passage 592 connects control port 594 of synchro valve 582 and second port 596 of latching solenoid 588. Structure and operation of synchro valves are known and conventional and, therefore, will not be described. An example synchro valve that can be used is model SV-1, which is commercially available from Bendix Commercial Vehicle Systems located in Avon, Ohio. Latching solenoid 588 and synchro valve 582 cooperate to support each of the first and second governors 526, 546 to be selected to act as primary or backup.

Controller 556 controls primary governor 526 via line 558, secondary governor 546 via line 560, latching solenoid 588 via line 598, and compressor motor 502 via line 562. In some embodiments, compressor motor 502 may comprise the vehicle engine. In some embodiments, compressor 506 may be electronic or independent from compressor motor 502. In this case, compressor motor 502 can be turned on/off directly without unloading compressor 506.

Controller 556 monitors system pressure signal via line 564 and controls primary governor 526, secondary governor 546, latching solenoid 588, and compressor motor 502 based upon control logic 566 that is stored in a data storage unit of controller 556. System air pressure signal on line 564 may be received from any type of pressure sensor on the vehicle. Controller 556 also monitors operation of first and second governors 526, 546. When controller 556 detects failure of first governor 526 to operate, controller 556 controls second governor 546 and latching solenoid 588 based upon control logic 566 to control system air pressure between the preset maximum pressure level and the preset minimum pressure level. After operation of first governor 526 is restored, controller 556 returns to controlling first governor 526 to control system air pressure.

Figure 5A:
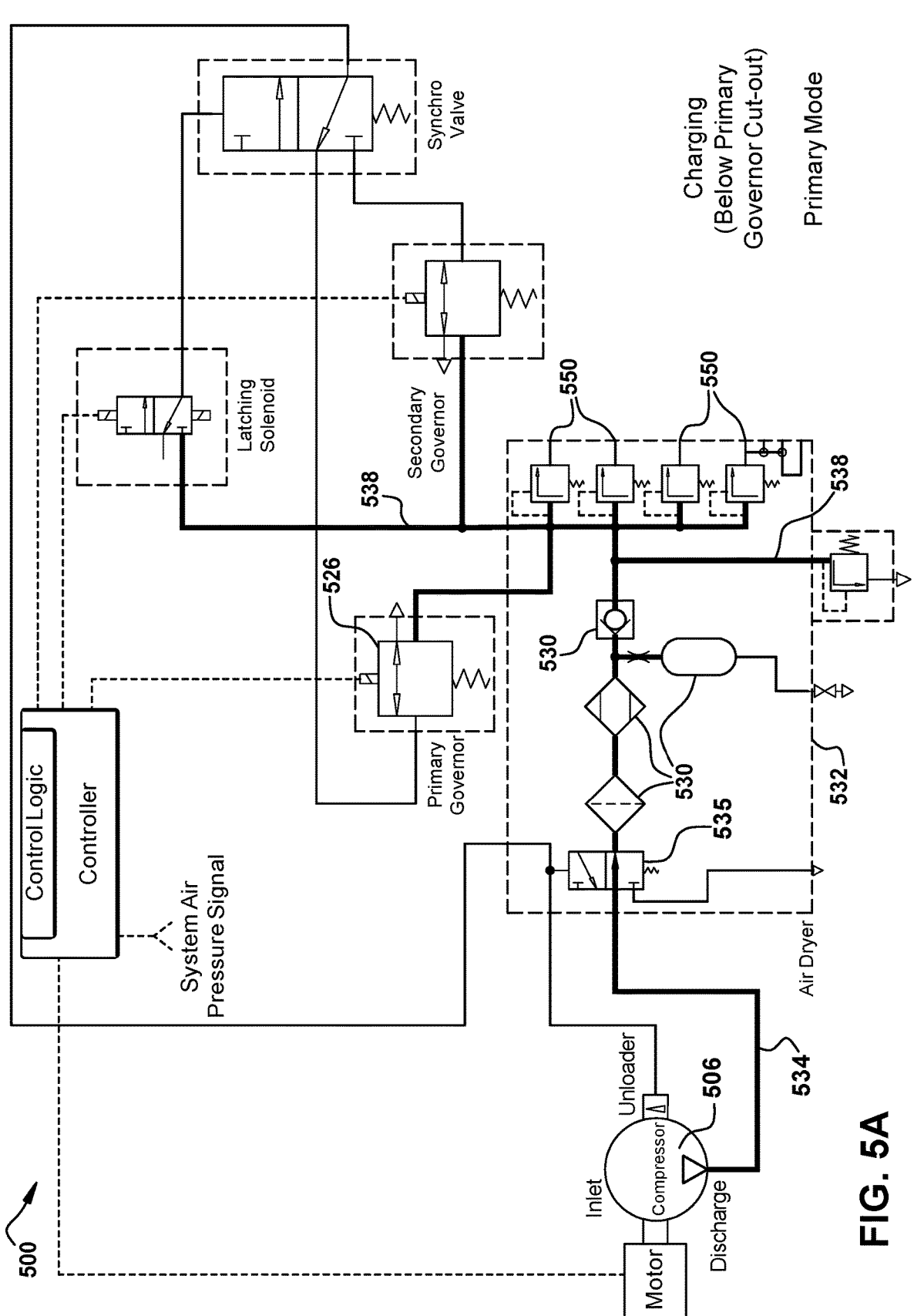

FIG. 5A shows components of the vehicle air brake charging system 500 in a primary mode of operation in which system 500 is charging (i.e., compressor 506 is loaded) due to system air pressure being below cut-in pressure of primary governor 526. When system 500 is charging, pressurized air in third passage 534 passes through the purge valve 535 and the other air dryer components 530 into fourth passage 538 to deliver pressurized air through delivery ports 550 of air dryer 532.

Figure 5B:
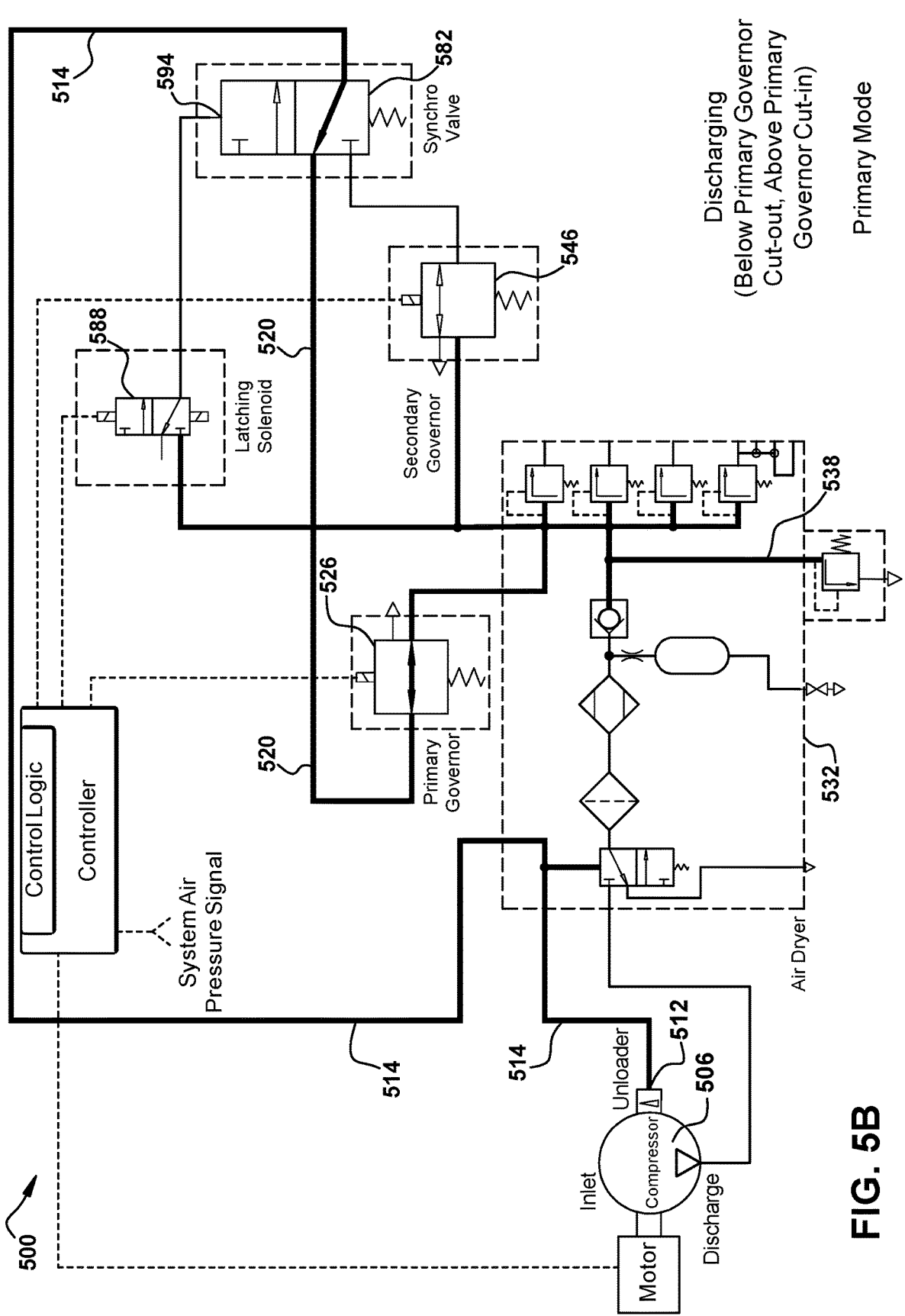

FIG. 5B shows components of the vehicle air brake charging system 500 in the primary mode of operation in which system 500 is discharging (i.e., compressor 506 is unloaded) due to system air pressure being below cut-out pressure of primary governor 526 and above cut-in pressure of primary governor 526. When system 500 is discharging, pressurized air in fourth passage 538 passes through primary governor 526 into second passage 520. The pressurized air then passes through synchro valve 582 without restriction into first passage 514 since latching solenoid 588 is controlled to be in its position shown in FIG. 5B. The pressurized air in first passage 514 is applied to unloader port 512 of compressor 506. Due to lack of pressurized air on control port 594 of synchro valve 582, the state of secondary governor 546 is ignored.

Figure 5C:
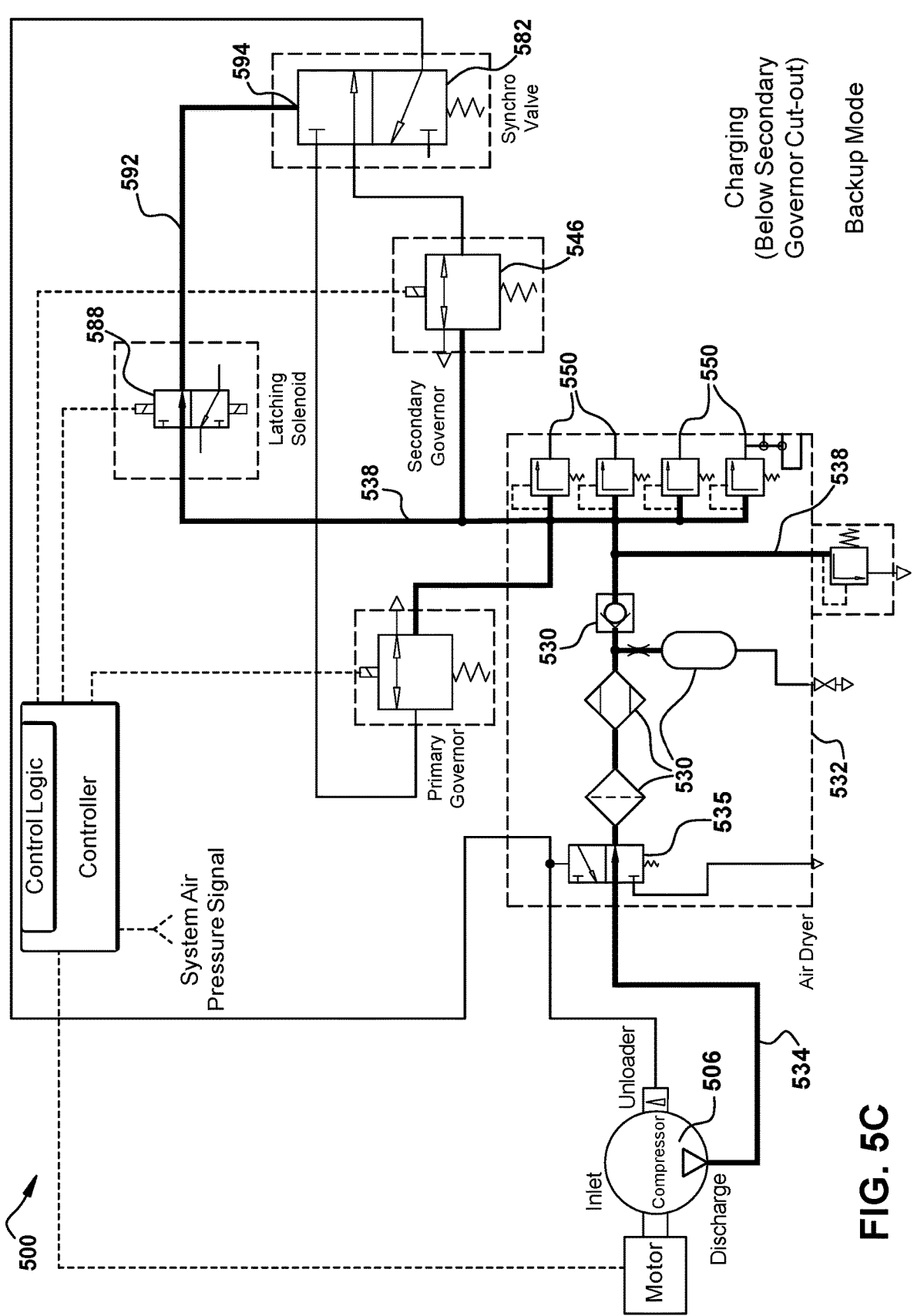

FIG. 5C shows components of the vehicle air brake charging system 500 in a backup mode of operation in which system 500 is charging due to system air pressure being below cut-out pressure of secondary governor 546. When system 500 is charging, pressurized air in third passage 534 passes through the purge valve 535 and the other air dryer components 530 into fourth passage 538 to deliver pressurized air through delivery ports 550 of air dryer 532. During backup mode of operation, latching solenoid 588 is controlled to be in its position shown in FIG. 5C. When latching solenoid 588 is in this position, pressurized air in fourth passage 538 passes through latching solenoid 588 to sixth passage 592 to control port 594 of synchro valve 582. Latching solenoid 588 remains in the position shown in FIG. 5C during the backup mode of operation. As is known, a latching solenoid requires power to change states, but not to maintain a state. Accordingly, latching solenoid 588 of FIG. 5C provides robustness against unforeseen events (e.g., a loss of power) during the backup mode of operation.

Figure 5D:
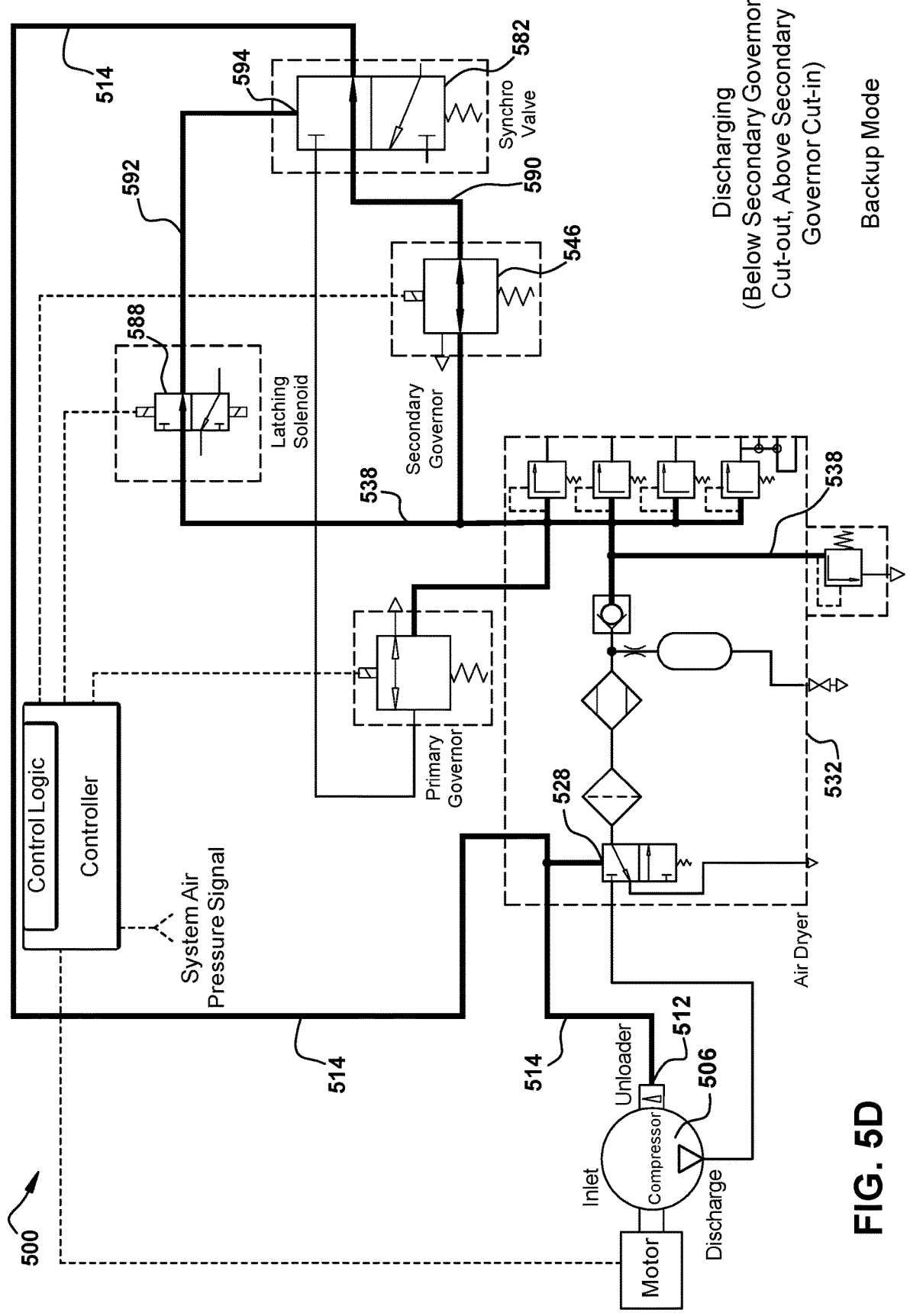

FIG. 5D shows components of the vehicle air brake charging system 500 in the backup mode of operation in which system 500 is discharging due to system air pressure being below cut-out pressure of secondary governor 546 and above cut-in pressure of secondary governor 546. When system 500 is discharging, pressurized air in fourth passage 538 passes through secondary governor 546 into fifth passage 590. Since latching solenoid 588 is in its position shown in FIG. 5D, the pressurized air in sixth passage 592 applied to control port 594 of synchro valve 582 maintains synchro valve 582 in its position shown in FIG. 5D. The pressurized air in fifth passage 590 then passes through synchro valve 582 into first passage 514 to unloader port 512 of compressor 506. Since pressurized air in first passage 514 is also applied to control port 528 of the purge valve 535, the air dryer 532 will purge air in the backup mode of operation as well as in the primary mode of operation.

Referring to FIGS. 6, 6A, 6B, 6C, and 6D, schematic diagrams are shown of a vehicle air brake charging system 600 in different modes of operation and embodying an example redundant governor apparatus in accordance with a sixth embodiment. In particular, FIGS. 6, 6A, 6B, 6C, and 6D show a variation of certain pneumatic passage connections shown in FIGS. 4, 4A, 4B, 4C, and 4D. In FIGS. 6, 6A, 6B, 6C, and 6D, solid lines represent pneumatic passages between components, heavy solid lines (i.e., thicker solid lines) represent pressurized pneumatic passages between components, dashed lines represent electrical connections between components, and double-solid lines represent mechanical couplings between components.

Figure 6:
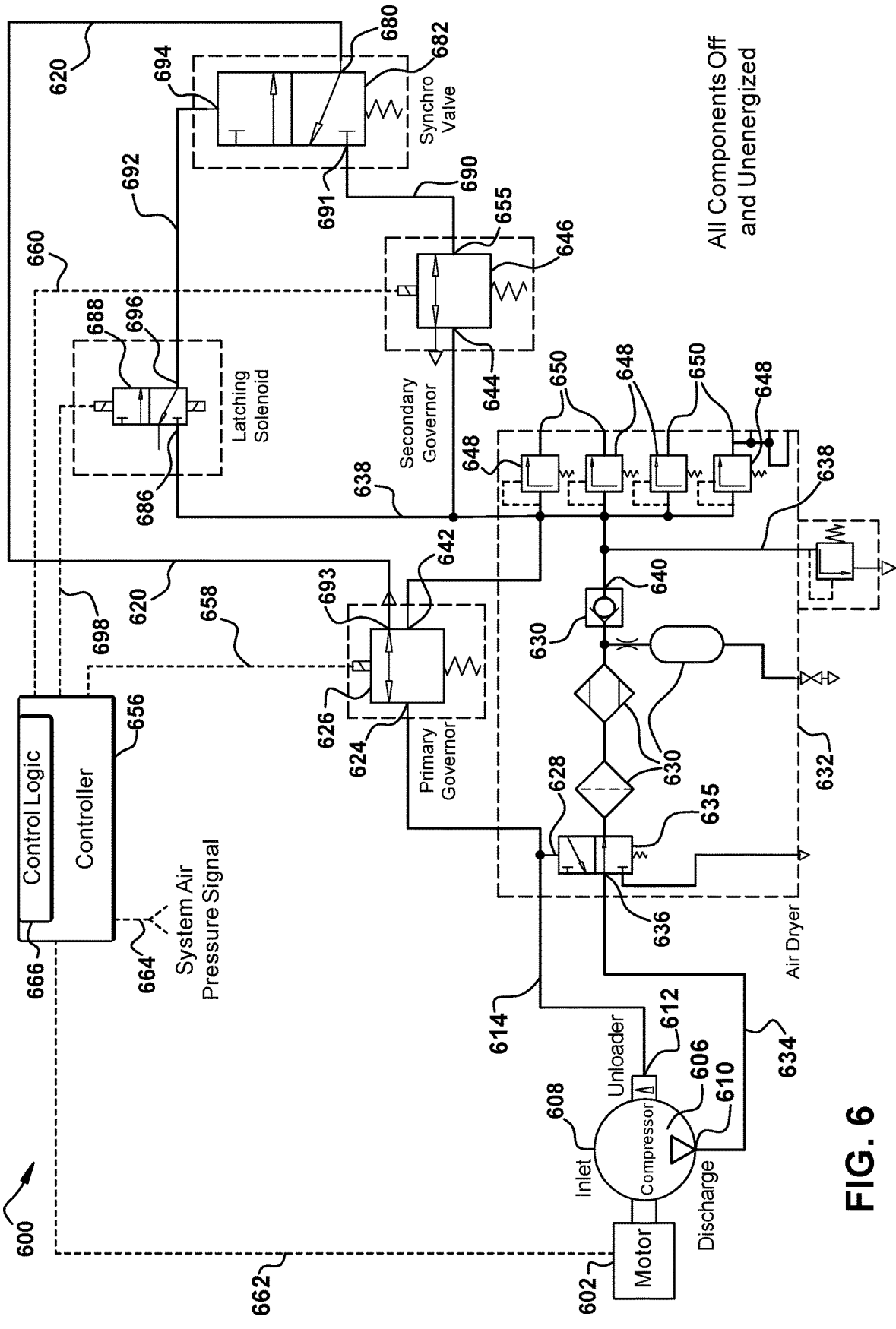
FIGS. 6, 6A, 6B, 6C, and 6D are schematic diagrams of a vehicle air brake charging system in different modes of operation and embodying an example redundant governor apparatus in accordance with a sixth embodiment.

FIG. 6 shows all components of the vehicle air brake charging system 600 in their off or unenergized states. Compressor motor 602 is coupled via coupling 604 to compressor 606 that has inlet port 608, discharge outlet port 610, and unloader port 612. First passage 614 connects unloader port 612 of compressor 606, control port 628 of a purge valve 635 within air dryer 632, and outlet port 624 of primary governor 626 (i.e., a first governor). Structure and operation of purge valve 635 and other air dryer components

630 within an air dryer are known and conventional and, therefore, will not be described. Second passage 620 connects delivery port 680 of synchro valve 682 and first inlet port 643 of primary governor 626.

Third passage 634 connects discharge outlet port 610 of compressor 606 and inlet port 636 of the purge valve 635 within air dryer 632. Fourth passage 638 connects outlet port 640 of the air dryer components 630, second inlet port 642 of primary governor 626, inlet port 644 of secondary governor 646 (i.e., a second governor), first port 686 of latching solenoid 688, and through a number of pressure protection components 648 within air dryer 632 to corresponding delivery ports 650 that are connectable to air braking system and air accessories (not shown) of the vehicle. Structure and operation of pressure protection components within an air dryer are known and conventional and, therefore, will not be described.

Fifth passage 690 connects supply port 691 of synchro valve 682 and outlet port 655 of secondary governor 646. Sixth passage 692 connects control port 694 of synchro valve 682 and second port 696 of latching solenoid 688. Structure and operation of synchro valves are known and conventional and, therefore, will not be described. An example synchro valve that can be used is model SV-1, which is commercially available from Bendix Commercial Vehicle Systems located in Avon, Ohio. Latching solenoid 688 and synchro valve 682 cooperate to support each of the first and second governors 626, 646 to be selected to act as primary or backup.

Controller 656 controls primary governor 626 via line 658, secondary governor 646 via line 660, latching solenoid 688 via line 698, and compressor motor 602 via line 662. In some embodiments, compressor motor 602 may comprise the vehicle engine. In some embodiments, compressor 606 may be electronic or independent from compressor motor 602. In this case, compressor motor 602 can be turned on/off directly without unloading compressor 606.

Controller 656 monitors system pressure signal via line 664 and controls primary governor 626, secondary governor 646, latching solenoid 688, and compressor motor 602 based upon control logic 666 that is stored in a data storage unit of controller 656. System air pressure signal on line 664 may be received from any type of pressure sensor on the vehicle. Controller 656 also monitors operation of first and second governors 626, 646. When controller 656 detects failure of first governor 626 to operate, controller 656 controls second governor 646 and latching solenoid 688 based upon control logic 666 to control system air pressure between the preset maximum pressure level and the preset minimum pressure level. After operation of first governor 626 is restored, controller 656 returns to controlling first governor 626 to control system air pressure.

Figure 6A:
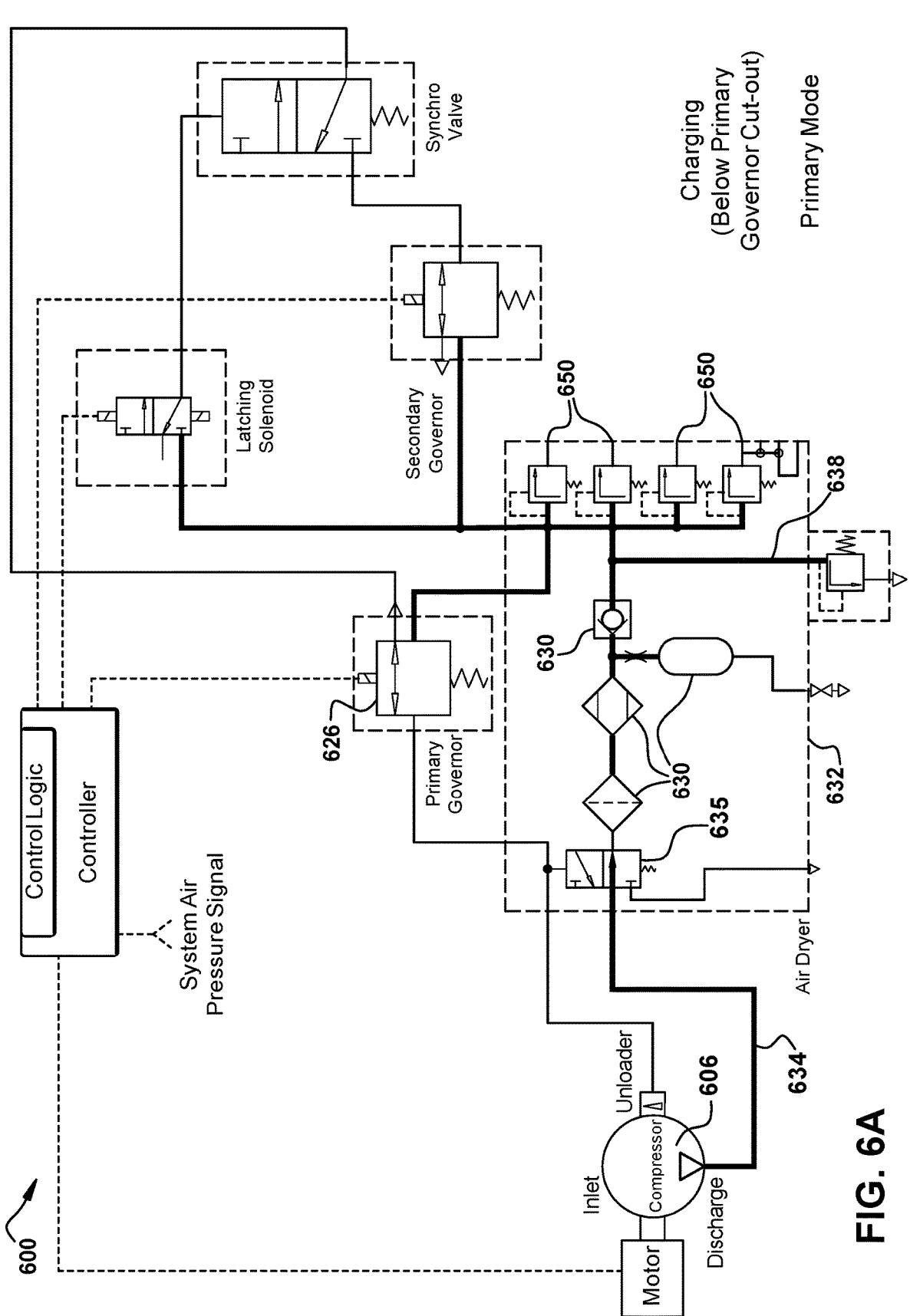

FIG. 6A shows components of the vehicle air brake charging system 600 in a primary mode of operation in which system 600 is charging (i.e., compressor 606 is loaded) due to system air pressure being below cut-in pressure of primary governor 626. When system 600 is charging, pressurized air in third passage 634 passes through the purge valve 635 and the other air dryer components 630 into fourth passage 638 to deliver pressurized air through delivery ports 650 of air dryer 632.

Figure 6B:
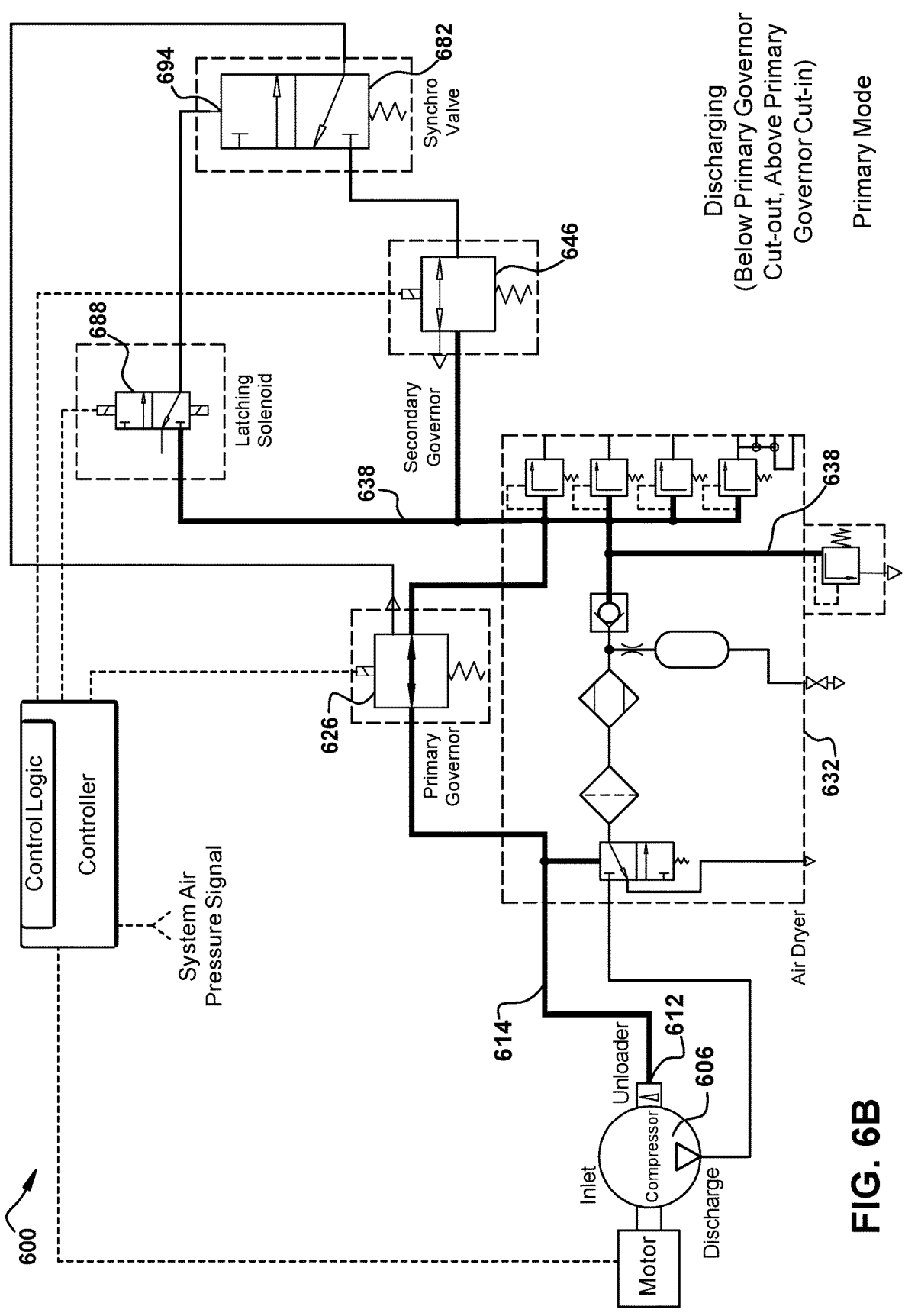

FIG. 6B shows components of the vehicle air brake charging system 600 in the primary mode of operation in which system 600 is discharging (i.e., compressor 606 is unloaded) due to system air pressure being below cut-out pressure of primary governor 626 and above cut-in pressure of primary governor 626. When system 600 is discharging, pressurized air in fourth passage 638 passes through primary governor 626 into first passage 614 to unloader port 612 of compressor 606. Latching solenoid 688 is controlled to be in its position shown in FIG. 6B. Due to lack of pressurized air on control port 694 of synchro valve 682, the state of secondary governor 646 is ignored.

Figure 6C:
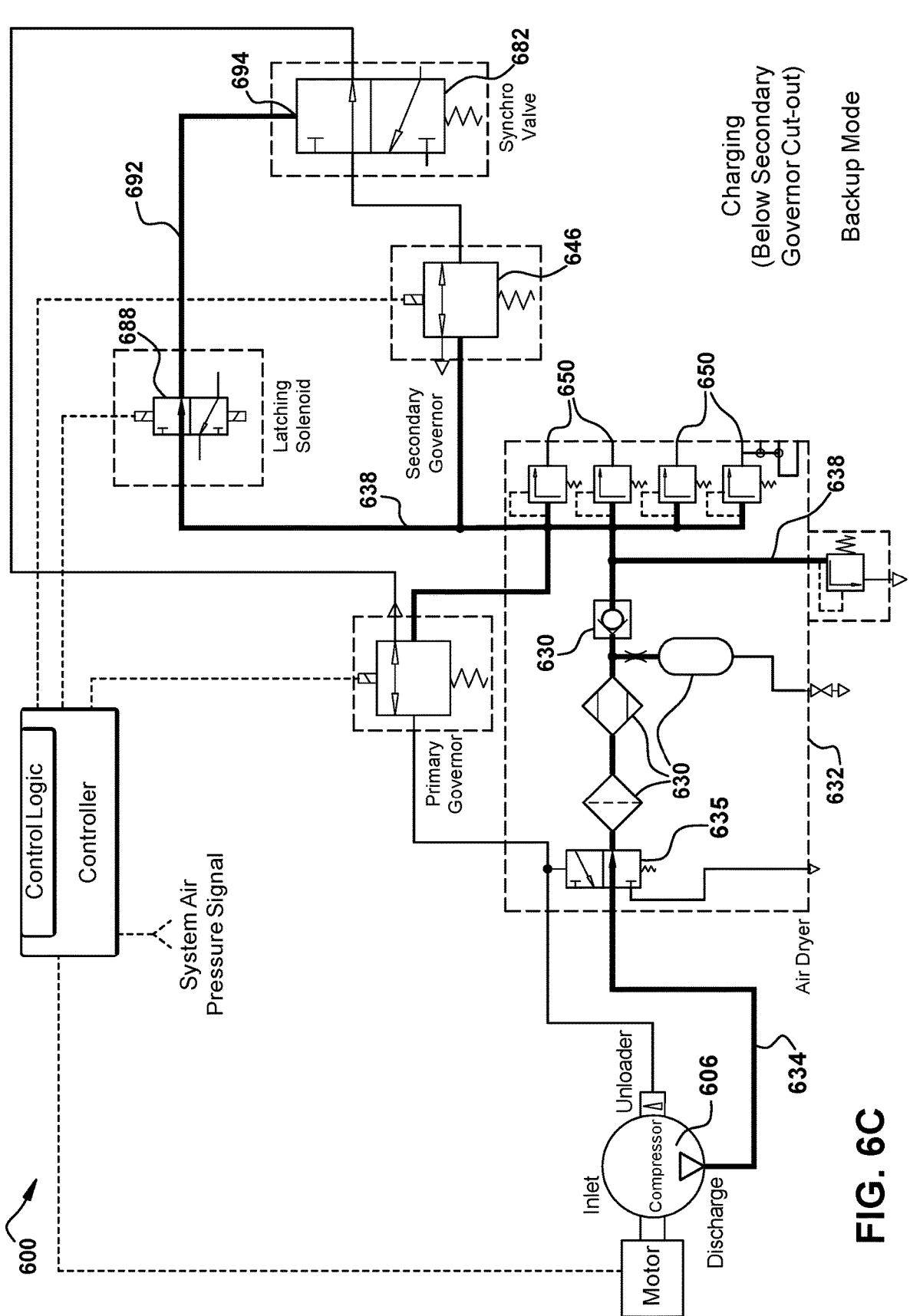

FIG. 6C shows components of the vehicle air brake charging system 600 in a backup mode of operation in which system 600 is charging due to system air pressure being below cut-out pressure of secondary governor 646. When system 600 is charging, pressurized air in third passage 634 passes through the purge valve 635 and the other air dryer components 630 into fourth passage 638 to deliver pressurized air through delivery ports 650 of air dryer 632. During backup mode of operation, latching solenoid 688 is controlled to be in its position shown in FIG. 6C. When latching solenoid 688 is in this position, pressurized air in fourth passage 638 passes through latching solenoid 688 to sixth passage 692 to control port 694 of synchro valve 682. Latching solenoid 688 remains in the position shown in FIG. 6C during the backup mode of operation. As is known, a latching solenoid requires power to change states, but not to maintain a state. Accordingly, latching solenoid 688 of FIG. 6C provides robustness against unforeseen events (e.g., a loss of power) during the backup mode of operation.

Figure 6D:
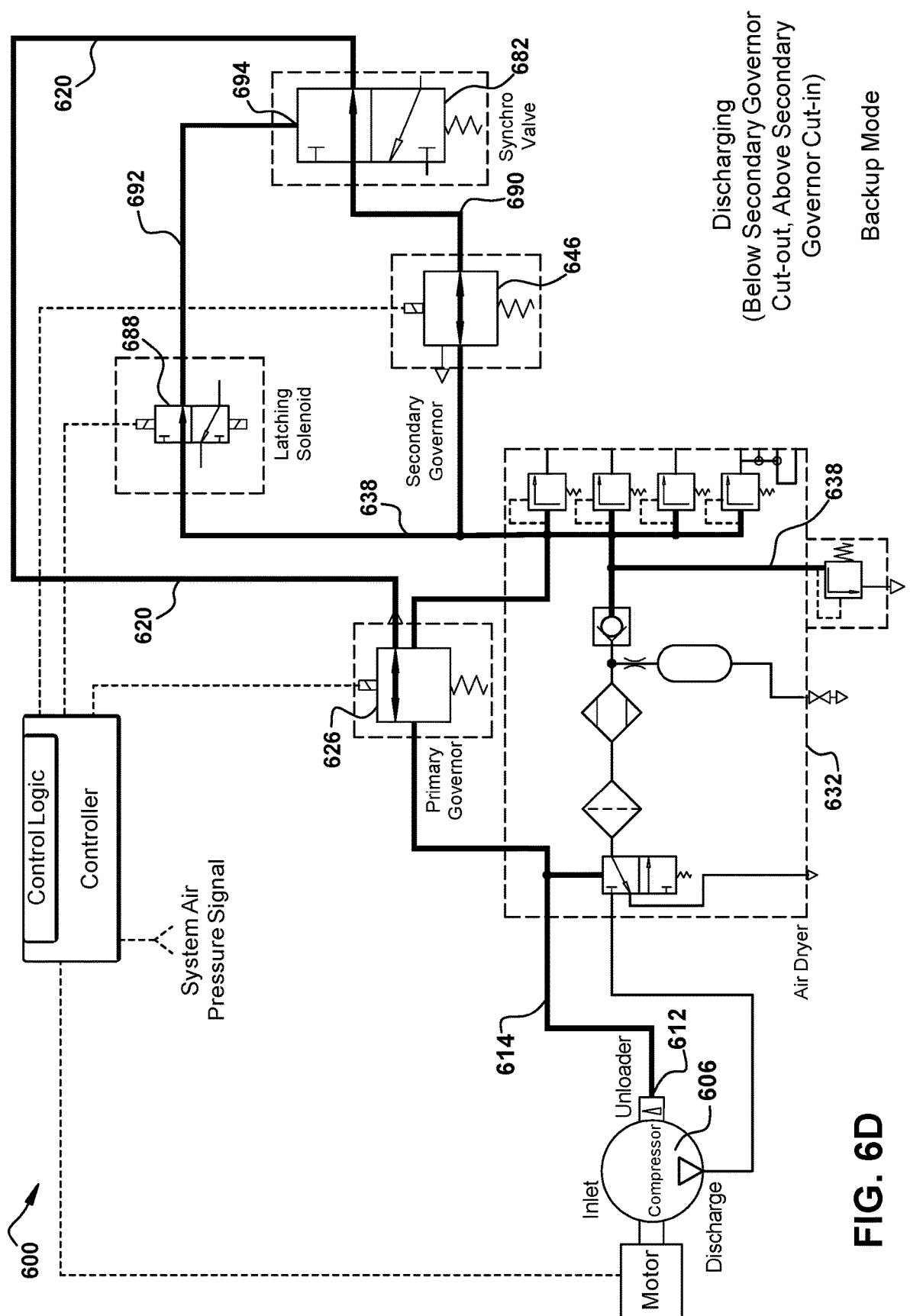

FIG. 6D shows components of the vehicle air brake charging system 600 in the backup mode of operation in which system 600 is discharging due to system air pressure being below cut-out pressure of secondary governor 646 and above cut-in pressure of secondary governor 646. When system 600 is discharging, pressurized air in fourth passage 638 passes through secondary governor 646 into fifth passage 690. The pressurized air in fifth passage 690 passes through synchro valve 682 to second passage 620, and then through primary governor 626 into first passage 614 to unloader port 612 of compressor 606. Since latching solenoid 688 is in its position shown in FIG. 6D, the pressurized air in sixth passage 692 applied to control port 694 of synchro valve 682 to maintain synchro valve 682 in its position shown in FIG. 6D. Also, since pressurized air in first passage 614 is also applied to control port 628 of the purge valve 635, the air dryer 632 will purge air in the backup mode of operation as well as in the primary mode of operation.

Although the above-description describes first and second governors comprising intelligent governors (i.e., electrically-controlled governors in the form of solenoid valves, and in particular 2/2 solenoid valves as shown in each of the above-described embodiments) which are responsive to electrical control signals, it is conceivable that the first and second governors comprise well-known, conventional mechanical governors (i.e., pneumatically-controlled governors in the form of pneumatic valves) which are responsive to pneumatic air pressure control signals instead of electrical control signals. When mechanical governors are used, the range of the cut-in/cut-out pressures of one governor need to be set higher than the range of the cut-in/cut-out pressures of the other governor to avoid interference between the two. For example, in the embodiment shown in FIGS. 1, 1A, 1B, 1C, and 1D, the cut-out pressure to secondary governor 146 is set higher than the cut-out pressure of primary governor 126.

In accordance with an aspect of the present disclosure, a first governor can act as primary and a second governor can act as backup to the first governor when the first governor is unable to act as primary, and the second governor can act as primary and the first governor can act as backup to the second governor when the second governor is unable to act as primary. The first and second governors may comprise intelligent governors (i.e., electrical governors) or mechanical governors (i.e., mechanical governors).

In accordance with another aspect of the present disclosure, either one of a pair of governors can operate as primary in a primary mode of operation and the other one of the pair of governors can operate as backup in a backup mode of operation, wherein either mode of operation can be selected as desired. The pair of governors may comprise intelligent governors (i.e., electrical governors) or mechanical governors (i.e., mechanical governors). If intelligent governors, control logic of a controller can be programmed to control the intelligent governors to provide a desired redundant governor configuration. If mechanical governors, the ranges of cut-in and cut-out pressures of the mechanical governors can be selected and set to provide a desired redundant governor configuration.

Figure 7:
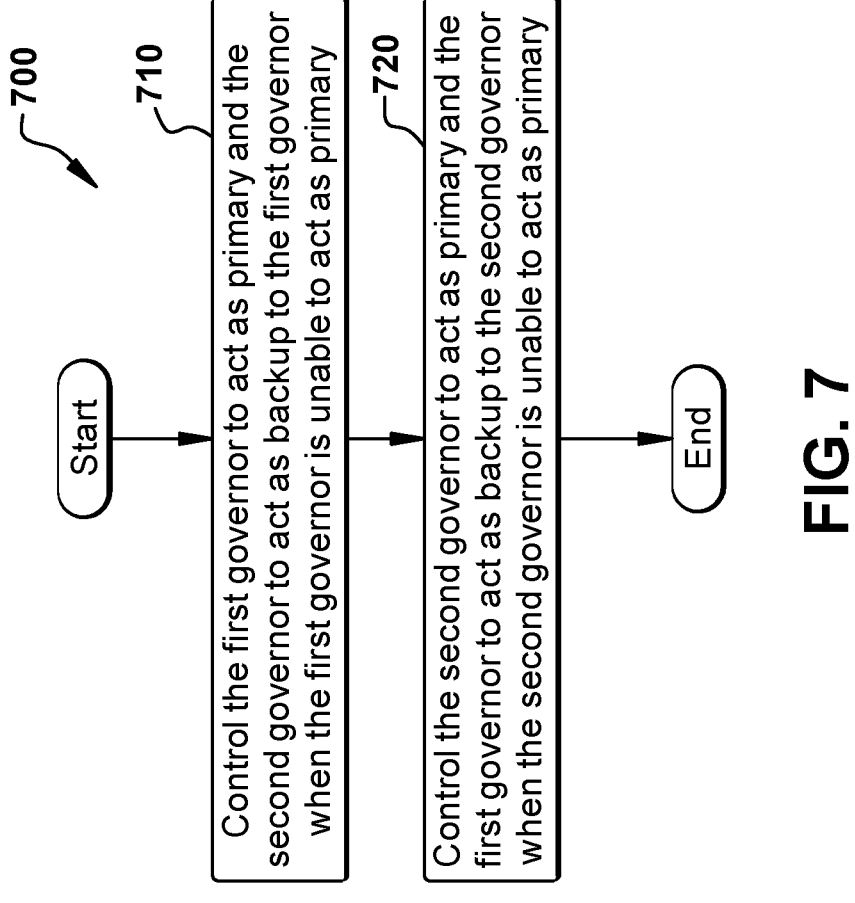
FIG. 7 is a flow diagram depicting an example method of operating a redundant governor apparatus in accordance with an embodiment.

Referring to FIG. 7, a flow diagram 700 depicting a method of operating a redundant governor apparatus in accordance with an embodiment is illustrated. In particular, a method is provided of operating first and second governors for a vehicle air brake charging system to provide governor redundancy. In block 710, the first governor is controlled to act as primary, and the second governor is controlled to act as backup to the first governor when the first governor is unable to act as primary. In block 720, the second governor is controlled to act as primary, and the first governor is controlled to act as backup to the second governor when the second governor is unable to act as primary. The process then ends.

In some embodiments, controlling the first governor comprises electrically controlling the first governor, and controlling the second governor comprises electrically controlling the second governor.

In some embodiments, controlling the first governor comprises pneumatically controlling the first governor, and controlling the second governor comprises pneumatically controlling the second governor.

In some embodiments, the method is performed by a computer having a memory executing one or more programs of instructions which are tangibly embodied in a program storage medium readable by the computer.

A number of advantages are provided by the disclosed embodiments. One advantage is that an occurrence of the compressor of the vehicle air brake charging system being left in the loaded mode in the event of a governor failure to operate is avoided. By not leaving the compressor stuck in the loaded mode, loss of vehicle fuel economy and loss of vehicle engine power are avoided.

Another advantage is that the disclosed redundant governor configurations are especially beneficial for use in autonomously-driven vehicles, whether fully autonomous or only partially autonomous (i.e., semi-autonomous), since these vehicles are operating in an environment away from human beings.

Although the above-description describes redundant governor configurations being used in a heavy vehicle such as a truck, it is conceivable that the example redundant governor apparatus 100, 200, 300, 400, 500, 600 disclosed herein may be used in other types of heavy vehicles, such as busses for example.

Program instructions (i.e., control logic) for enabling a controller to perform operation steps in accordance with flow diagram 700 shown in FIG. 7 or control logic 166, 266, 366, 466, 566, and 666 shown in FIGS. 1, 2, 3, 4, 5, and 6, respectively, may be embedded in memory internal to the controller. Alternatively, or in addition to, program instructions may be stored in memory external to the controller. As an example, program instructions may be stored in memory internal to a different electronic controller unit of the vehicle. Program instructions may be stored on any type of program storage media including, but not limited to, external hard drives, flash drives, and compact discs. Program instructions may be reprogrammed depending upon features of the particular electronic controller unit.

Aspects of disclosed embodiments may be implemented in software, hardware, firmware, or a combination thereof. The various elements of the system, either individually or in combination, may be implemented as a computer program product tangibly embodied in a machine-readable storage device for execution by a computer processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of one electronic controller unit, it is conceivable that any number of electronic controller units may be used. Moreover, it is conceivable that any type of electronic controller unit may be used. Suitable electronic controller units for use in vehicles are known and, therefore, have not been described. Accordingly, the program instructions of the present disclosure can be stored on program storage media associated with one or more vehicle electronic controller units.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A redundant governor apparatus for a vehicle air brake charging system, the apparatus comprising:
   a first governor;
   a second governor; and
   a number of components arranged to enable (i) the first governor to act as primary and the second governor to act as backup to the first governor when the first governor is unable to act as primary, and (ii) the second governor to act as primary and the first governor to act as backup to the second governor when the second governor is unable to act as primary;
   wherein the number of components includes a double check valve interconnecting the first and second governors;
   wherein the double check valve is interconnected such that (i) pressurized air from a compressor is unloaded through the double check valve and the first governor when system air pressure is below cut-out pressure and above cut-in pressure of the first governor in a primary mode of operation of the first governor, and (ii) pressurized air from the compressor is unloaded through the double check valve and the second governor when system air pressure is below cut-out pressure and above cut-in pressure of the second governor in a backup mode of operation of the second governor.

2. The redundant governor apparatus according to claim 1, wherein each of the first and second governors comprises a solenoid valve.

3. The redundant governor apparatus according to claim 2, wherein each solenoid valve comprises a 2/2 solenoid valve.

4. The redundant governor apparatus according to claim 1, wherein each of the first and second governors comprises a pneumatic valve.

5. The redundant governor apparatus according to claim 4, wherein cut-in/cut-out range of one of the first and second governors is set higher than cut-in/cut-out range of the other one of the first and second governors.

6. The redundant governor apparatus according to claim 1, wherein the number of components includes an arrangement of a latching solenoid and a synchro valve connecting the first and second governors and cooperating to enable each of the first and second governors to be selected to act as primary or backup.

7. The redundant governor apparatus according to claim 1, wherein the number of components includes a controller that provides electrical signals to control the first and second governors to direct passage of pressurized air away from an unloader port of a compressor of the vehicle air brake charging system.

8. A redundant governor apparatus for a vehicle air brake charging system, the apparatus comprising:
   a first governor;
   a second governor; and
   means for enabling the first and second governors to be controlled such that (i) either one of the governors can operate as primary in a primary mode of operation and the other one of the governors can operate as backup in a backup mode of operation, and (ii) either mode of operation can be selected as desired;
   wherein the enabling means includes a double check valve interconnecting the first and second governors;
   wherein the double check valve is interconnected such that (i) pressurized air from a compressor is unloaded through the double check valve and the first governor when system air pressure is below cut-out pressure and above cut-in pressure of the first governor in the primary mode of operation of the first governor, and (ii) pressurized air from the compressor is unloaded through the double check valve and the second governor when system air pressure is below cut-out pressure and above cut-in pressure of the second governor in the backup mode of operation of the second governor.

9. The redundant governor apparatus according to claim 8, wherein each of the first and second governors comprises a solenoid valve.

10. The redundant governor apparatus according to claim 8, wherein each of the first and second governors comprises a pneumatic valve.

11. The redundant governor apparatus according to claim 8, wherein the enabling means includes an arrangement of a latching solenoid and a synchro valve connecting the first and second governors and cooperating to enable each of the first and second governors to be selected to act as primary or backup.

12. A method of operating first and second governors for a vehicle air brake charging system to provide governor redundancy, the method comprising:

controlling the first governor to act as primary and the second governor to act as backup to the first governor when the first governor is unable to act as primary;

controlling the second governor to act as primary and the first governor to act as backup to the second governor when the second governor is unable to act as primary; and wherein a double check valve interconnects the first and second governors such that (i) pressurized air from a compressor is unloaded through the double check valve and the first governor when system air pressure is below cut-out pressure and above cut-in pressure of the first governor in a primary mode of operation of the first governor, and (ii) pressurized air from the compressor is unloaded through the double check valve and the second governor when system air pressure is below cut-out pressure and above cut-in pressure of the second governor in a backup mode of operation of the second governor.

13. The method according to claim 12, wherein controlling the first governor comprises electrically controlling the first governor, and controlling the second governor comprises electrically controlling the second governor.

14. The method according to claim 12, wherein controlling the first governor comprises pneumatically controlling the first governor, and controlling the second governor comprises pneumatically controlling the second governor.

15. The method according to claim 12, wherein the method is performed by a computer having a memory executing one or more programs of instructions which are tangibly embodied in a program storage medium readable by the computer.

\* \* \* \* \*